United States Patent [19]
Yamada et al.

[11] Patent Number: 5,587,806
[45] Date of Patent: Dec. 24, 1996

[54] APPARATUS FOR SEPARATELY RECORDING INPUT CODED VIDEO SIGNAL AND IMPORTANT DATA GENERATED THEREFROM

[75] Inventors: Masazumi Yamada, Moriguti; Shinya Kadono, Kobe; Shiro Kato, Hirakata, all of Japan

[73] Assignee: Matsushita Electric Industrial Co., Ltd., Osaka, Japan

[21] Appl. No.: 215,421

[22] Filed: Mar. 21, 1994

[30] Foreign Application Priority Data

Mar. 26, 1993 [JP] Japan .................... 5-068533
Apr. 7, 1993 [JP] Japan .................... 5-080492

[51] Int. Cl.⁶ .................... H04N 5/76; H04N 5/78
[52] U.S. Cl. .................... 386/68; 386/111; 386/112
[58] Field of Search .................... 348/405; 358/310, 358/335, 342; 360/33.1, 9.1, 10.1, 10.3; H04N 5/76, 5/78, 5/92

[56] References Cited

U.S. PATENT DOCUMENTS

| | | | |
|---|---|---|---|
| 4,797,752 | 1/1989 | Giddings | 358/342 |
| 4,969,055 | 11/1990 | Oberjatzas et al. | |
| 5,057,918 | 10/1991 | Denoyelle et al. | |
| 5,073,821 | 12/1991 | Juri | 348/405 |
| 5,136,391 | 8/1992 | Minami | 358/310 |
| 5,140,437 | 8/1992 | Yonemitsu et al. | 358/335 |
| 5,341,250 | 8/1994 | Uchida et al. | 358/335 |
| 5,359,428 | 10/1994 | Kubota et al. | 358/335 |
| 5,383,063 | 1/1995 | Bannai et al. | 360/33.1 |
| 5,392,128 | 2/1995 | Sato | 358/335 |
| 5,418,623 | 5/1995 | Park | 358/335 |
| 5,418,658 | 5/1995 | Kwon | 358/335 |
| 5,461,486 | 10/1995 | Uchida | 358/335 |

FOREIGN PATENT DOCUMENTS

| | | |
|---|---|---|
| 0367264 | 5/1990 | European Pat. Off. . |
| 0401854 | 12/1990 | European Pat. Off. . |
| 0469842 | 2/1992 | European Pat. Off. . |
| 0529233 | 3/1993 | European Pat. Off. . |
| 63-232691 | 9/1988 | Japan . |

*Primary Examiner*—Thai O. Tran
*Attorney, Agent, or Firm*—Wenderoth, Lind & Ponack

[57] ABSTRACT

An apparatus records and reproduces high efficiency coded video signal to and from a recording medium and includes an important data generating circuit for generating at least an important data from an input video signal, a data arranging circuit for arranging the important data so as to be recorded at predetermined positions, and a recording and reproduction control circuit for controlling recording and reproducing operations. The input video signal is separated into information common to each large block and information native to small blocks of the each large block. A coding mode of each of the small blocks thus separated is judged. The input video signal is divided into a plurality of packets, data for generating a common information from the input video signal is decoded, the common information thus generated is stored at a predetermined position of a packet, and each packet is sequentially recorded on a recording medium. Data for generating a common information from a predetermined position of each packet is read out when reproducing a recorded signal, the common information is generated from read-out data, and plural small blocks are collected using the common information thereby to compose a large block, so that high speed reproduction can be obtained when an intra-/inter-picture coded signal is recorded.

28 Claims, 18 Drawing Sheets

4nth SUB-PICTURE (4n+1)th SUB-PICTURE (4n+2)th SUB-PICTURE (4n+3)th SUB-PICTURE

TAPE RUNNING DIRECTION

HEAD RUNNING DIRECTION

APPARATUS FOR SEPARATELY RECORDING INPUT CODED VIDEO SIGNAL AND IMPORTANT DATA GENERATED THEREFROM

BACKGROUND OF THE INVENTION

1. Field of the Invention

This invention relates to a video signal recording apparatus for recording video signals and its reproducing apparatus and more particularly, to a video signal recording apparatus and reproducing apparatus capable of obtaining a picture having high picture quality in a high speed reproduction mode operating at a speed which is as high as n times a normal speed and suppressing a degradation in picture quality even if an erroneous MPEG (Moving Picture Coding Expert Group) coded signal intra-/inter-picture adaptively coded digital video signal for ATV (Advanced Television) now under consideration in America was digitally recorded in a VCR (Video Cassette Recorder).

2. Description of the Prior Art

Such a video signal recording apparatus has been conventionally proposed that when recording a video signal on a recording medium, by recording newly formed data for the high speed reproduction use into a sub-code area which is a position corresponding to a trace pattern of a head when reproducing at high speed, the picture quality in high speed reproduction can be improved (refer to Japanese Laid-Open Patent Application No. 2-94071).

With the conventional apparatus, it is presupposed that an input video signal is subjected to coding so as to be entirely finished on an intra-picture basis and yet, the amount of thus coded data is constant for each picture.

With the conventional apparatus, however, such a problem has arisen that an improvement is limited to a picture that is to be reproduced at a speed of two times the normal speed.

With the conventional apparatus, in addition, there arises such a problem that it cannot be applied for a case that the input video signal is coded by inter-picture coding or it is not coded with a fixed length code for each picture. As a result, intra-/inter-picture adaptively coded input video signal data, as with MPEG or ATV, does not have a constant data amount for each picture and the inter-picture coded part thereof cannot be directly decoded, so that the input video signal cannot be recorded.

Further, when considering upon a the fact that valiable length data for the high speed reproduction use is recorded into the sub-code area, it is necessary to ensure a range where the maximum value is considered, and thus a problem arises in which an unnecessary range may occur.

Also, an error correction code generally uses a product code that performs correction in a track unit. As a result, if the reproduction is made so that the head obliquely traverses recording tracks during the high speed reproduction, the inner code of the product code can be employed but an outer code thereof cannot, and a problem arises in which the error correction ability will be degraded compared with that of normal reproduction.

Furthermore, even with respect to the inner code of the product code, if the input signal does not become a fixed length in a macro-block unit, in a case that a packeting is made simply in the order of data transmission, the picture quality during the high speed reproduction is disadvantageously reduced if erroneous. Namely, since the coded data have variable length in the macro-block unit, the decoding can be correctly achieved only in a case that data showing the beginning or finishing of each macro-block can be reproduced sequentially from the beginning, so that in a case that packets cannot be sequentially reproduced due to error occurrence or high speed reproduction, the picture quality will be largely degraded.

In order to solve the above-mentioned problems, for example, a proposal entitled "Video Signal Coding Apparatus" is disclosed in Japanese Laid-Open Patent Publication No. 4-220889. However, even when a top position of a block coded signal can be detected and a coding mode can be decided, in the case of the MPEG signal, necessary information for decoding, that is, a direct current component of a coefficient in a case of intra-picture coding mode and a motion vector information in a case of inter-picture coding mode, are differentially coded and transmitted, so that the block cannot be correctly decoded unless a preceding microblock can be correctly decoded.

SUMMARY OF THE INVENTION

An object of this invention is to improve a picture quality of high speed reproduced pictures.

Another object of this invention is to provide important data generating means for effectively generating important data.

A further another object of this invention is to provide data arranging means for arranging important data and normal data so as to allow the important data to be effectively reproduced when reproducing at a high speed.

A still further another object of this invention is to provide reproduction control means whereby only the important data can be reproduced when reproducing at a high speed.

A further object of this invention is to provide recording and reproducing means whereby degradation of a picture quality can be made small when using the normal data in the high speed reproduction and/or when any error occurs when reproducing.

In order to attain the above-mentioned objects, a first constitution of this invention is to provide a video signal recording apparatus which records an intra-/inter-picture coded digital video signal as an input video signal on a recording medium, the video signal apparatus comprising important data generating means for generating important data which is intra-picture coded data; data arranging means for arranging said important data collectively into predetermined areas on tracks; and recording means for recording said important data on the recording medium.

With the constitution as shown above, said important data are arranged and recorded at predetermined positions on a tape, the important data can be read out when reproducing at high speed and the picture quality of reproduced pictures can be improved.

In order to attain the above-mentioned objects, a second constitution of this invention is to provide said important data generating means comprising intra-/inter-picture decision means for judging whether the predetermined picture is entirely intra-picture coded or not, memory means for storing said input video signal corresponding to a picture commanded through memory renewal decision means to output said important data, counting means for counting a number of said important data outputted from said memory means after renewal of a content of said memory means, and said memory renewal decision means for outputting a command to said memory means so as to store said input video signal when said intra-/inter-picture decision means judges that said input video signal is intra-picture coded and yet, a counted value obtained through said counting means exceeds a predetermined value.

With the constitution as above, a great part of the intra-picture coded data recorded for the high speed reproduction use can be reproduced in high speed reproduction, thus being capable of forming high speed reproduced pictures with high picture quality.

In order to attain the above-mentioned objects, a third constitution of this invention is to provide said important data generating means comprising intra-/inter-picture decision means for judging whether a predetermined picture is entirely intra-picture coded or not, first memory means for storing temporarily said input video signal corresponding to a picture judged such as to be intra-picture coded through said intra-/inter-picture decision means, second memory means for storing data for one picture which is stored or being stored on a nearest time when a command is outputted from memory renewal decision means and for outputting said important data, counting means for counting a number of said important data after renewal of a content of said second memory means, and said memory renewal decision means for outputting a command so as to transmit a content of said first memory means to said second memory means when said number of said important data exceeds a predetermined value.

With the constitution as above, in said second memory means is always stored the newest video signal for one picture, and if the video signal supplied from said first memory means is outputted just when the counted value of said counting means exceeds a predetermined value, the video signal can be switched in a moment.

In order to attain the above-mentioned objects, a fourth constitution of this invention is to provide a video signal recording and reproducing apparatus which has an intra-/inter-picture coded digital video signal as an input video signal and has a function for controlling reproduction of a recorded video signal of said input video signal comprising important data generating means for generating important data which is intra-picture coded data, data arranging means for arranging said important data collecting into predetermined tracks, recording means for recording said important data, and reproduction control means for reproducing said important data only.

With the constitution as above, since said important data are arranged in predetermined tracks, said important data can be read out in the high speed reproduction whereby the picture quality can be improved.

In addition, in case that specific tracks are made reproducible by using a movable head or by performing intermittent feel reproduction, it becomes possible to provide the same error correction ability as in the normal reproduction.

In order to attain the above-mentioned objects, a fifth constitution of this invention is to provide a video signal recording apparatus comprising packeting means which divides an input video signal into a plurality of packets, said input video signal being a digital video signal which is intra-/inter-picture adaptively coded for each of small blocks, a plurality of said small blocks being obtained by dividing each of large blocks, and a plurality of said large blocks being obtained by dividing a picture coded signal separating means for separating said input video signal into a large block of common information which is a common information to respective small blocks of each of said large blocks and a small block native information which is a native information for said respective small blocks, coding mode decision means for judging whether said small block native information is intra-picture coded or inter-picture coded, common information generating data decoding means for decoding a common information generating data for generating a common information necessary for composing a large block by collecting a plurality of said small blocks from said input video signal, common information generating data recording means for recording said common information generating data into a first predetermined position of a packet containing a small block thereof, and packet recording means for recording each of said packets sequentially on a recording medium, and packet recording means for recording each of said packets sequentially on a recording medium.

According to the fifth constitution, the coding mode can be judged for each small block of a packet and in the case of the intra-picture coding mode, the direct current component of a coefficient is recorded and in the case of the inter-picture coding mode, the motion vector is recorded not as a differential coded value but as a true value, so that even in the event that the preceding macro-block cannot be detected and decoded due to any packet loss, the signal can be correctly decoded.

DESCRIPTION OF THE PREFERRED EMBODIMENTS

First, a description will be made as to a high efficiency coded video signal for the sake of simplification of the explanations of the following preferred embodiments.

A high efficiency coding system typically including MPEG is based on inter-frame (or inter-field) coding for removing redundancy in the time axis direction. In the following descriptions, the terms "frame" and "field" may be replaceably used with each other, and the term "frame (or field)" is abbreviated as "frame" in the following explanations.

The inter-frame coding is to code the difference between the present frame to be coded and the already coded frame, for example, to code it on a basis of discrete cosine transform (DCT). In the intra-frame coding, not an inter-frame difference but an intra-frame data is directly coded intermittently (for example, DCT-coded). The coding in which the redundancy in the spatial direction is removed without removing the redundancy in the time axis direction is called refresh and the data obtained by the refresh is called refresh data.

Methods of refresh may be a batch-refresh in which the entirely of one frame is subjected to batch-refresh an a predetermined period and a partial refresh in which a picture is divided into plural areas to be sequentially refreshed at a predetermined period in a frame-by-frame manner.

If only the inter-frame difference signal as shown above is coded and transmitted, the decoding can be correctly made only in the case that the decoding is made from the first coded data. In addition, if any error occurs, the following decoded output signals will be erroneous, so that the refresh is carried out as shown above.

Figure 1:
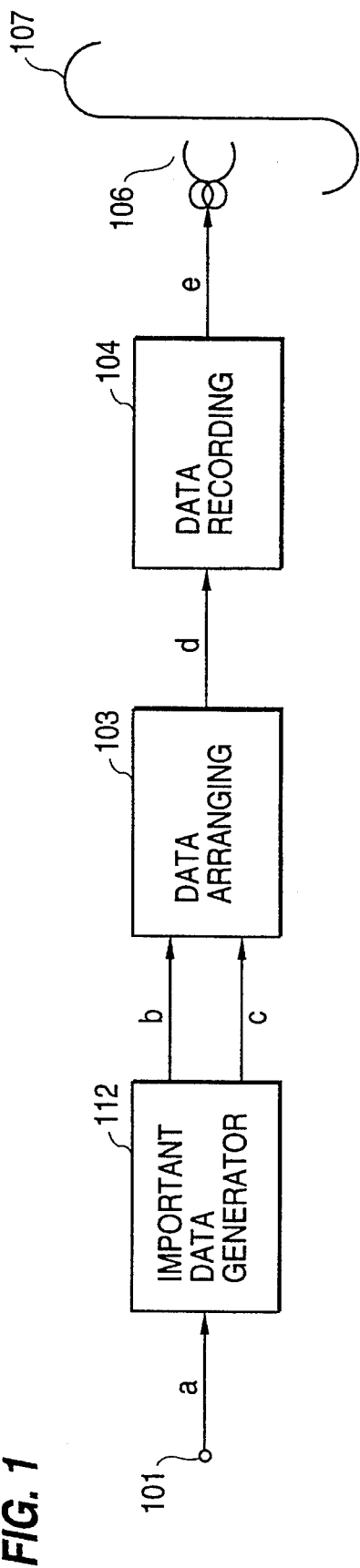
FIG. 1 is a block diagram of a video signal recording apparatus of a first embodiment of this invention.

FIG. 1 is a block diagram of a video signal recording apparatus of a first embodiment of this invention. Hereinafter, blocks having the same functions are indicated at the same reference numerals and their explanations will be omitted.

When recording, an important data generating circuit 112 generates a normal data b and an important data c from a digital coded data a inputted from a terminal 101 and supplies the normal data b and the important data c to a data arrangement circuit 103. The data arrangement circuit 103 arranges the normal data b and important data c so as to record them respectively into predetermined positions on a tape thereby. The normal data b and the important data c recorded on the tape are a recording data d. The recording data d is supplied to a data recording circuit 104. The data recording circuit 104 applies predetermined codings such as error correction and recording codings to the recording data d and then, supplies a recording current signal e which is in response to the coded data to a head 106. The head 106 records the recording current signal e into a recording medium 107.

The operation of the video signal recording apparatus as shown above will be explained below.

Figure 12:
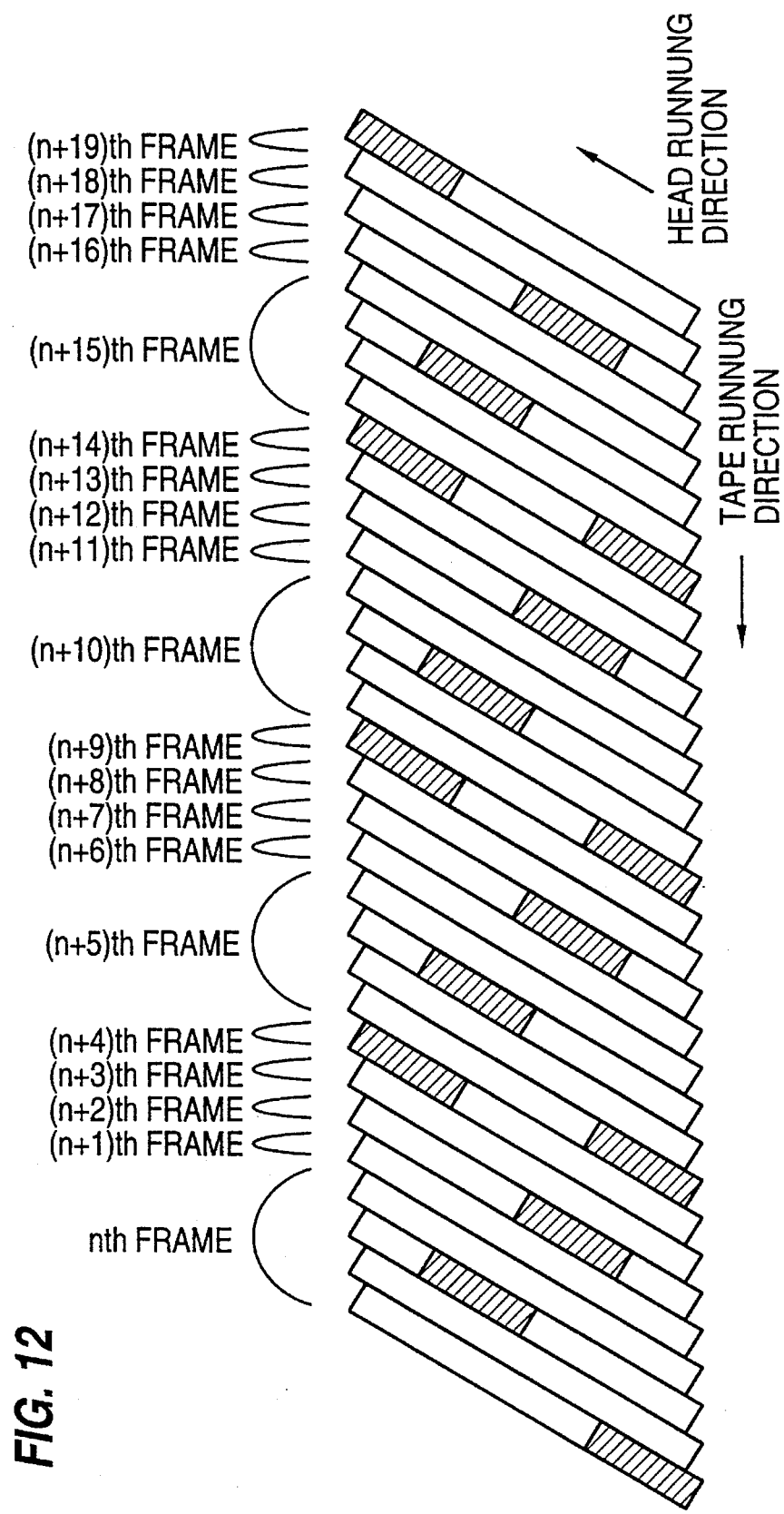
FIG. 12 is an arrangement diagram of data recorded on a tape in the first embodiment.
Figure 18:
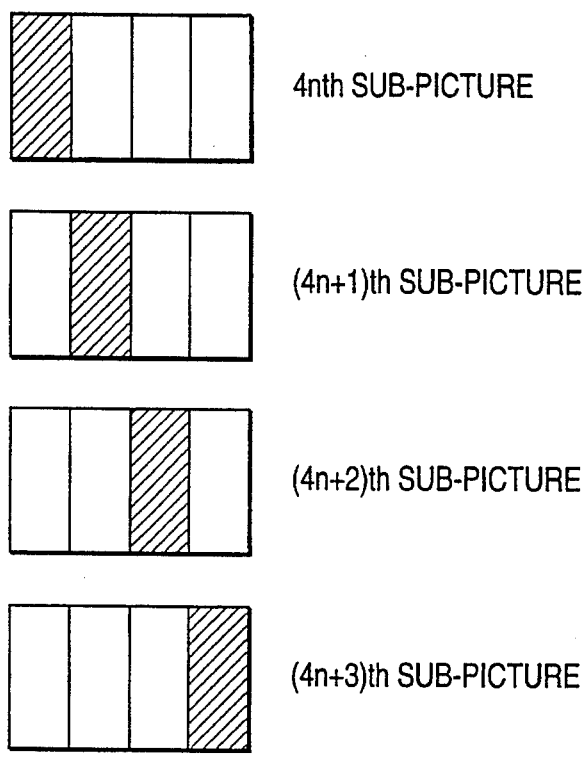
FIG. 18 is a diagram showing positions where intra-picture coding and inter-picture coding are carried out, respectively, in a partial refresh picture.
Figure 19:
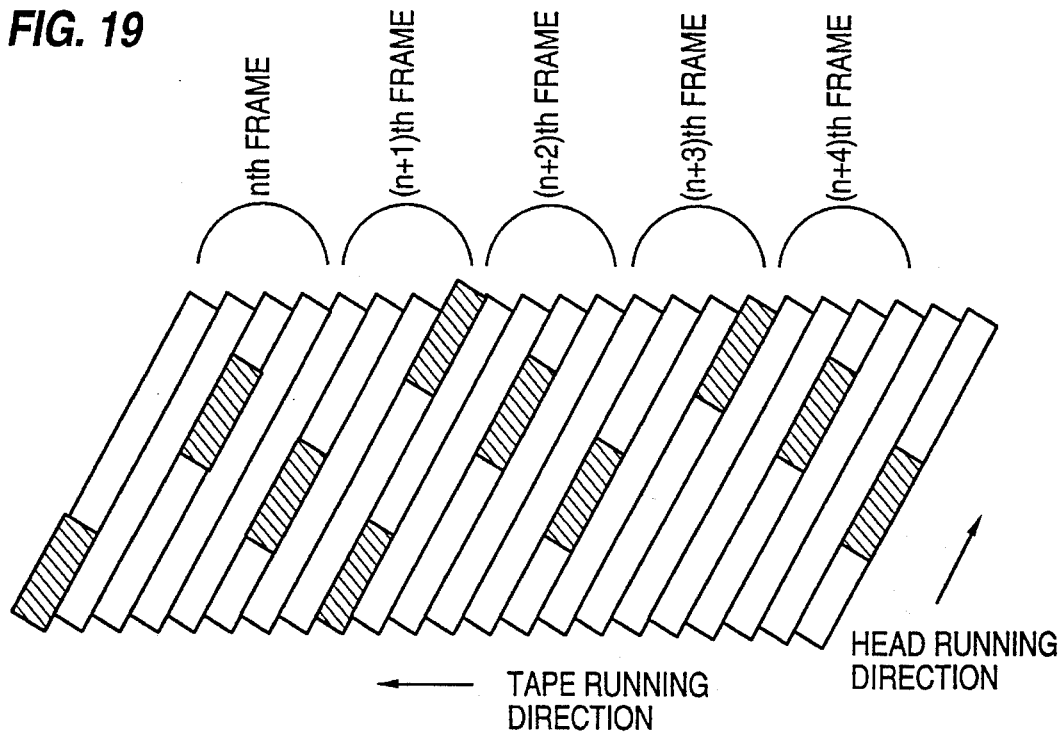
FIG. 19 is an arrangement diagram of data recorded on a tape in a conventional format.

FIG. 12 shows a format of data recorded on a tape, which is different from a conventional one shown in FIG. 18 and in which the entire of a picture is intra-picture coded for every five frames such as nth frame (n is integer and n>0), (n+5) th frame, (n+10) th frame, (n+15) th frame and so on. In a case of a refresh picture, a number of data necessary for coding that becomes a coding distortion of the same degree is increased compared with a case of being mixed with an inter-picture coded data. As a result, in this embodiment, it is supposed that the refresh picture necessitates four tracks for recording compared with the other picture that necessitates one track for recording. Accordingly, in order that the data of the nth frame is recorded for a quadruple high speed reproduction use, it becomes necessary to record the important data into the hatched areas of FIG. 12, and it becomes necessary that it is multiplexed in the tape length of a normal reproduction for 20 frames and recorded.

In general, in a case of high speed reproduction, a satisfactory picture quality can be obtained when more than predetermined number of pictures can be provided per unit time. As a result, if the same data is recorded two times for a high speed reproduction use, it is necessary that in a case of quadruple high speed reproduction, as shown in the hatched areas of FIG. 12, it is required to be multiplexed and recorded in a tape length for 40 frames from the nth frame to (n+39) th frame.

Figure 13:
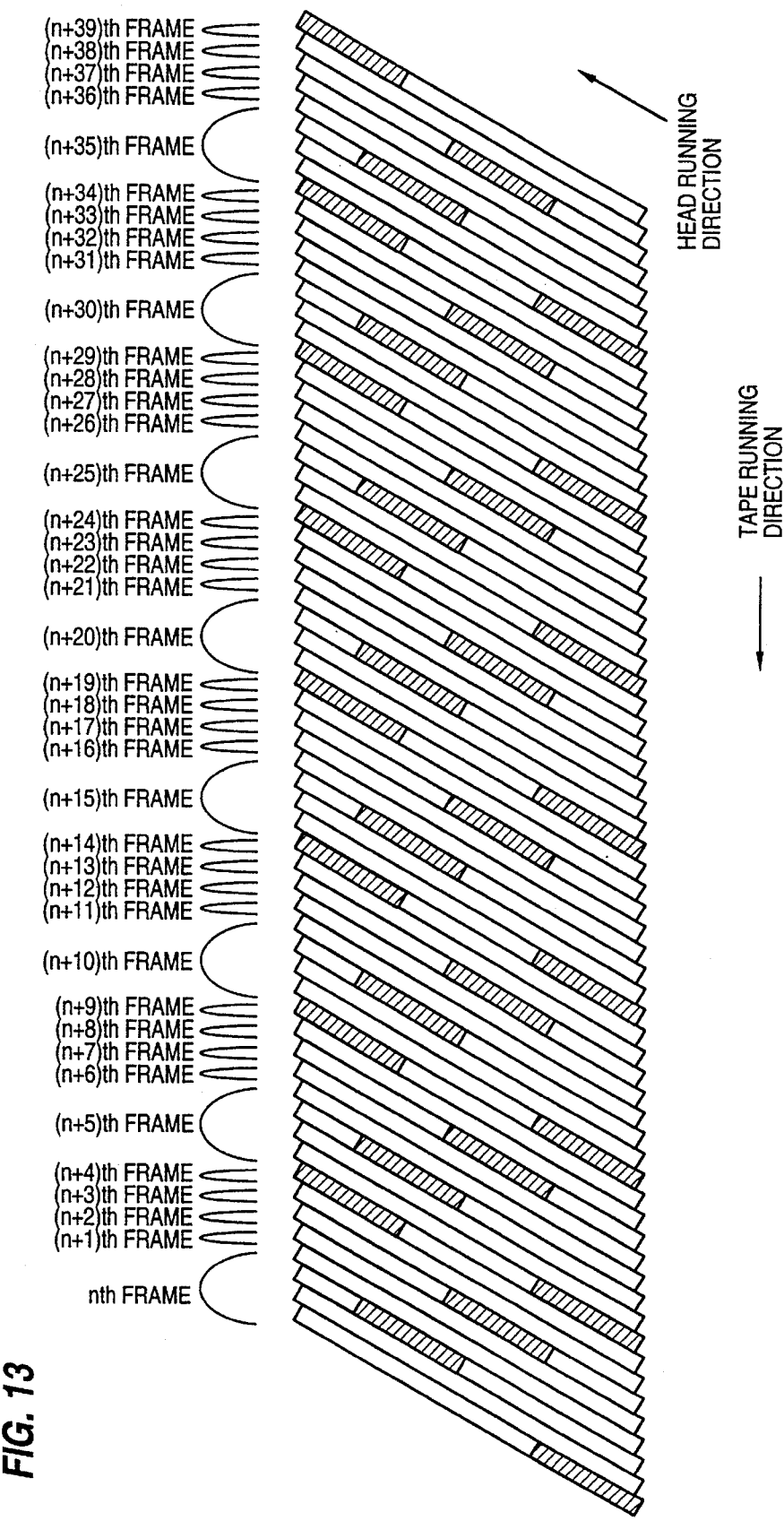
FIG. 13 is another arrangement diagram of the data recorded on the tape in the first embodiment.

FIGS. 12 and 13 each shows an example that a period of a picture recorded on a tape for the high speed reproduction use is an integer multiple of a period of the refresh picture. As a result, if the tape is edited at the point where the video signals for the high speed and normal reproduction uses are simultaneously finished their recordings, degradation of picture quality of both the normal and high speed reproductions at the editing point can be reduced.

Figure 14:
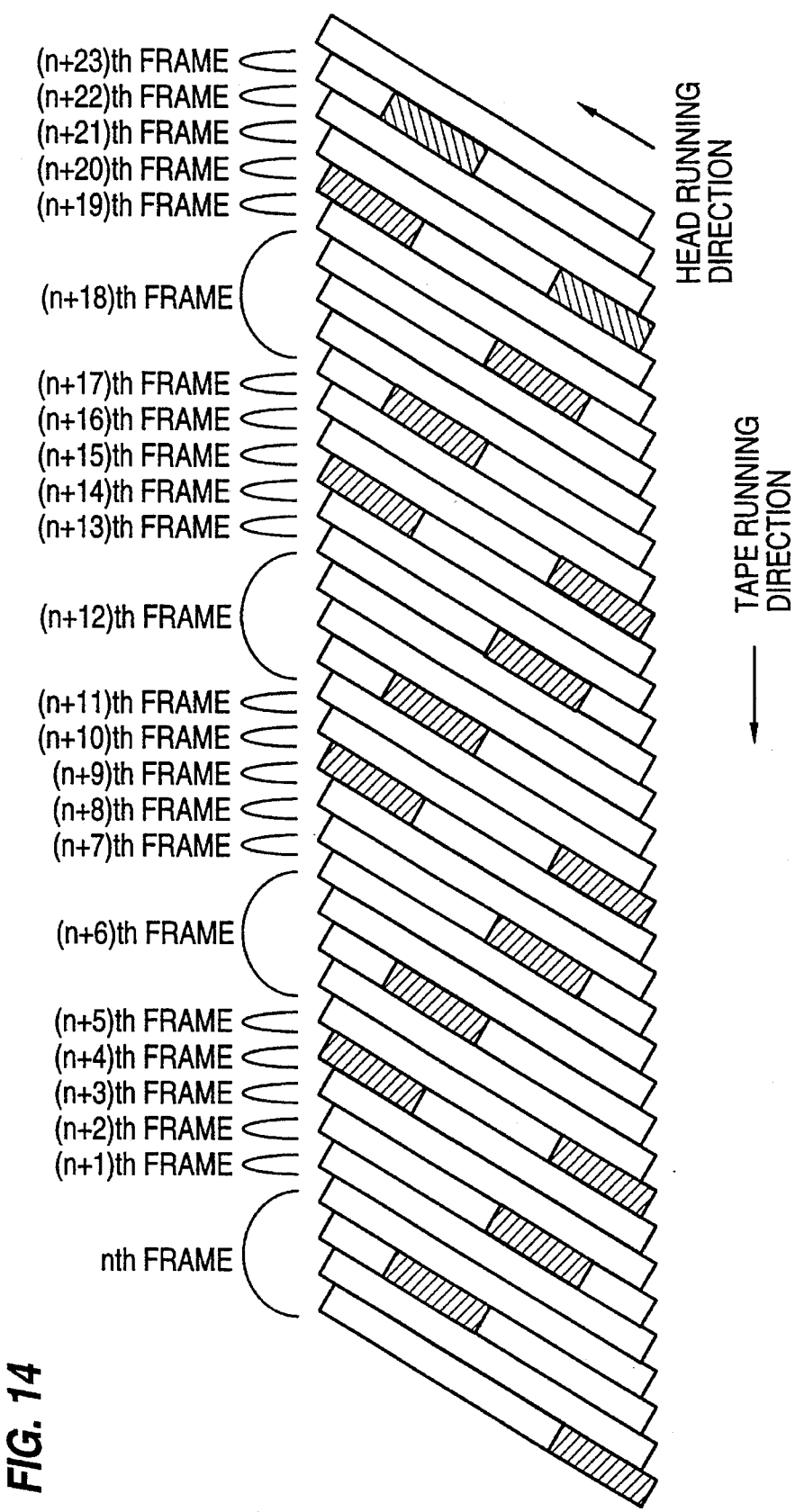
FIG. 14 is an arrangement diagram of data recorded on the tape when a period of a refresh picture and a period of an important data are different from each other in the first embodiment of this invention.

In case that a number of data is largely changed depending on the frame, however, it is possible that periods of the both pictures will not coincide with each other as shown in FIG. 14. FIG. 14 shows the case that the refresh picture has a period of six frames and the hatched areas show the recording positions of data for one picture for the high speed reproduction use, and the cross-hatched areas show the recording positions of the important data for the other picture use.

Figure 15:
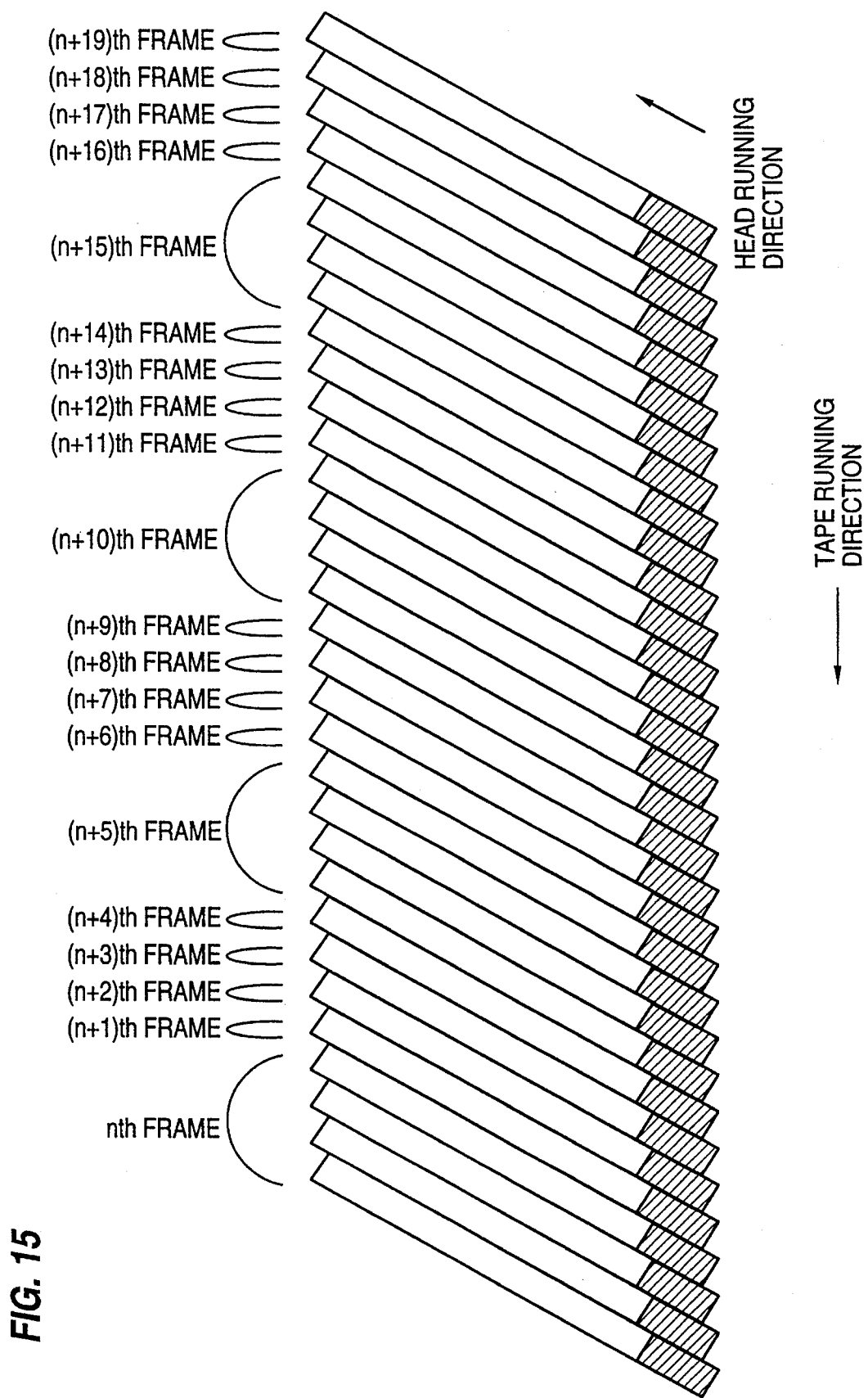
FIG. 15 is an arrangement diagram of data recorded on the tape when an important data is recorded in positions different from positions for data for the normal reproduction use in the first embodiment of this invention.

In addition, the data for the high speed reproduction use may be recorded in a different position from that for the normal reproduction use as shown in hatched areas of FIG. 15. The data arrangement circuit 103 arranges the important data c and the normal data b so that the important data c is recorded into the hatched areas and the normal data b is recorded into the other areas. By arranging the important data c in a beat-form, the head 106 surely passes through the hatched areas even if it obliquely scans the tracks. As a result, the important data c in the hatched areas that the head 106 scans can be reproduced.

By forming the video signal recording apparatus capable of recording as shown above, the recording can be made so that at least a part of the important data can be reproduced in the high speed reproduction. Accordingly, even with a less expensive digital data reproducing apparatus, a high speed-reproduced picture of high efficiency-coded video signal can be obtained.

Next, a second embodiment of this invention will be described below while referring to the drawings.

Figure 2:
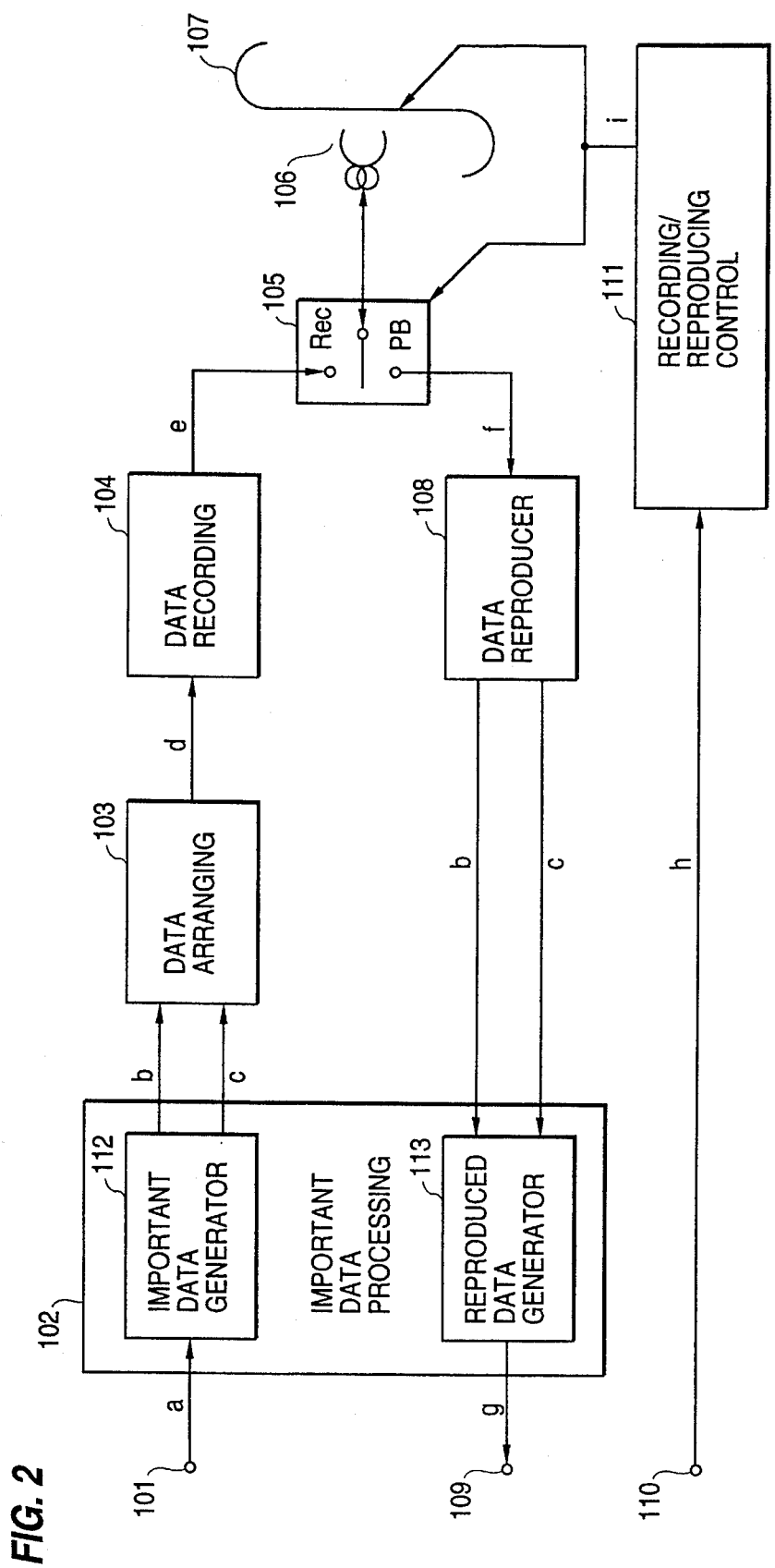
FIG. 2 is a block diagram of a video signal recording and reproducing apparatus of a second embodiment of this invention.

FIG. 2 is a block diagram of a video signal recording and reproducing apparatus, in which 101 is an input terminal, 102 is an important data processing circuit, 103 is a data arranging circuit, 104 is a data recording circuit, 105 is a switching circuit, 106 is a head, 107 is a recording medium, 108 is a data reproducing circuit, 109 is an output terminal, 110 is a mode signal input terminal, 111 is a recording/reproducing control circuit, a is a digital coded data, b is a normal data, c is an important data, d is a recording data, e is a recording current signal, f is a reproduced output signal, g is a reproduced data, h is a mode signal and i is a control signal.

In the important data processing circuit 102, 112 is an important data generator, and 113 is a reproduced data generator.

The operation of the video signal recording and reproducing apparatus structured as above will be explained below.

When recording, the digital coded data a is received from the terminal 101 and sent to the important data generator 112 of the important data processing circuit 102. The important data generator 112 generates the important data c and the normal data b from the digital coded data a to be supplied to the data arranging circuit 103. The data arranging circuit 103 arranges the normal data b and the important data c so as to be recorded in response to respective specific tracks thereby to obtain the recording data d. The recording data d is supplied to the data recording circuit 104. The data recording circuit 104 applies the recording data d with a predetermined coding such as, for example, error correction coding and record coding and outputs the recording current signal e corresponding to the coded data to the switching circuit 105. The switching circuit 105 is connected to a Rec-side and the recording current signal e is supplied through the switching circuit 105 to the head 106 to be recorded into the recording medium.

When reproducing, the switching circuit 105 is connected to a PB-side, the head 106 fetches data recorded in the recording medium 107, and the reproduced output signal f thus fetched is supplied to the data reproduction circuit 108. The data reproduction circuit 108 applies an amplification detection to the reproduced output signal f and then, a predetermined decoding such as, for example, the recording decoding and error correction decoding thereto to thereby supply the normal data b and the important data c to the reproduced data generator 113 of the important data processing circuit 102. When reproducing normally, the reproduced data generator 113 applies a predetermined process to the normal data b and the important data c and supplies the reproduced data g thus processed to the terminal 109. When reproducing at high speed, the reproduced data generator 113 applies a predetermined process to the important data c and supplies the reproduced data g thus obtained to the terminal 109.

The recording/reproducing control circuit 111 performs a predetermined control in response to the mode signal h received from the terminal 110. Namely, when recording, the recording/reproducing control circuit 111 outputs the control signal i to control the switching circuit 105, the head 106 and the recording medium 107 so that the recording operation can be performed as predetermined. When reproducing, the recording/reproducing control circuit 111 outputs the control signal i to control the switching circuit 105, the head 106 and the recording medium so that predetermined reproducing operation can be performed. In this case, however, the mode signal h is a signal to command mode change of the video signal recording and reproducing apparatus, which includes switching between recording and reproducing modes, changing between reproducing speed modes and so on.

Next, the data arranging circuit 103 will be explained below while referring to the drawings.

Figure 16:
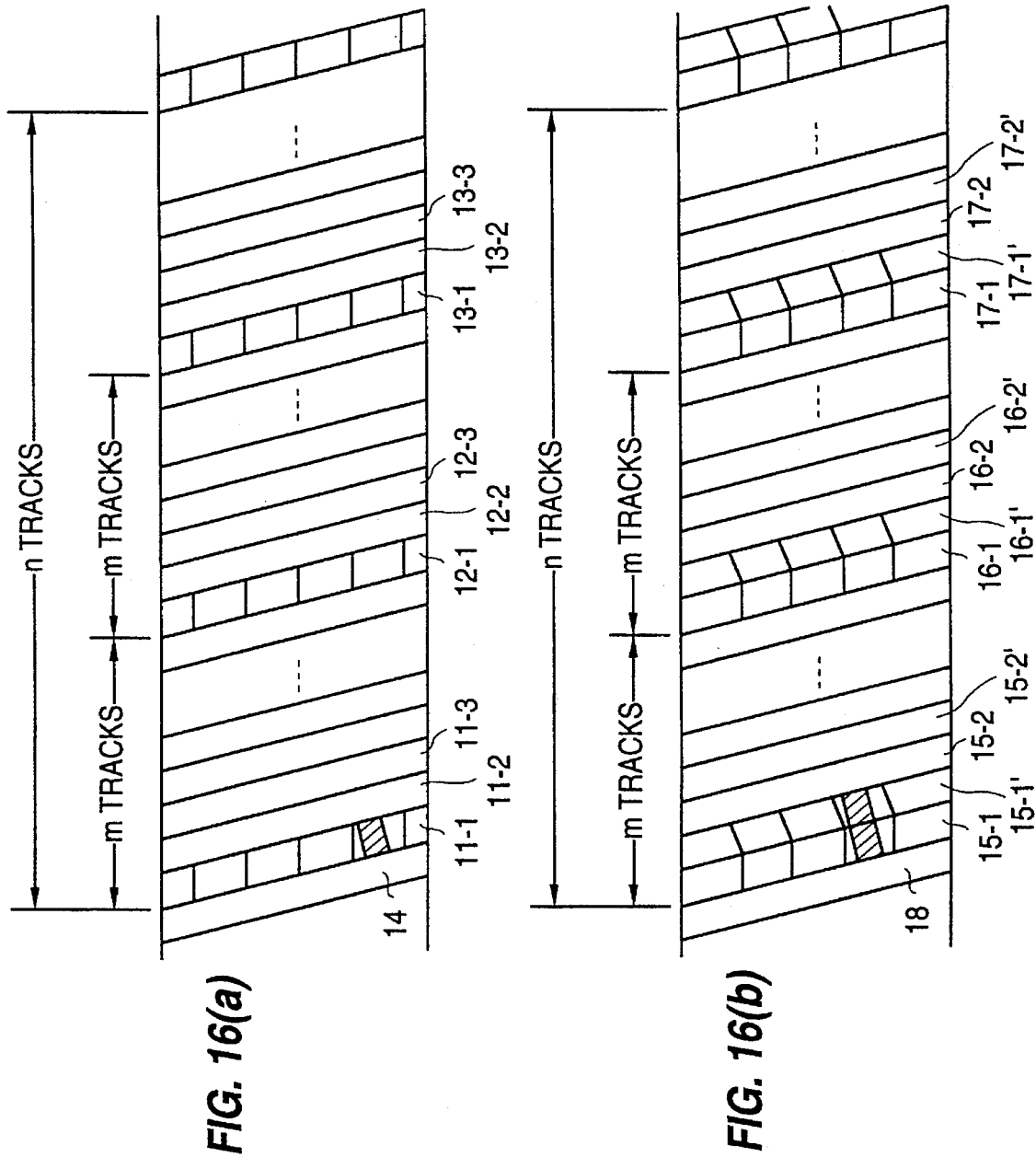
FIGS. 16(a) and 16(b) are arrangement diagrams of data recorded on a tape in the second embodiment of this invention.

FIG. 16 is an arrangement diagram of data recorded on a tape in the second embodiment of this invention.

In (a) of FIG. 16, 11-1, 11-2, ..., 12-1, 12-2, ..., 13-1, 13-2, ... are tracks when recorded through a single head on a magnetic recording medium, 14 is a movable head composed of a voltage controllable piezo-electric device, and the tracks 11-1, 12-1, 13-1, ... are recorded at a period of m tracks (m is a positive integer). Here, n is an integer multiple of m.

The data arranging circuit 103 outputs the recording data d in which the normal data b and the important data c are arranged so that the important data c is recorded into the tracks 11-1, 12-1, 13-1, ... which are formed as above and the normal data b is recorded into the other tracks.

In FIG. 16(b) shows a track pattern on the recording medium 109 when recording by using a combination head, which is similar to a case that such a recording and reproducing apparatus that plural heads are simultaneously scanned is employed, and explanations thereof will be omitted here.

As explained above, if the important data is collectively arranged and recorded into predetermined tracks, these tracks can be reproduced during high speed reproduction. Particularly, in a case that the important data is any data that is visually important, high speed reproduction with high picture quality can be realized.

Further, parities such as an inner code and an outer code of a product code of error correction can be obtained as in a case of normal reproduction and as a result, the video signal recording and reproducing apparatus in the second embodiment may have an error correction ability equal to that in the case of the normal reproduction.

Also, the head 14 was made of the voltage controllable piezo-electric device, not limited thereto, any device may be employed if it has replaceable function therewith.

Another circuit of the data arranging circuit 103 will be explained below.

In FIG. 17, 21-1, 21-2, ..., 22-1, 22-2, ..., 23-1, 23-3, ... are tracks recorded through a single head on the magnetic recording medium, 24 is a magnetic head and the tracks 21-1, 22-1, 23-1, ... are recorded at a period of n tracks (n is a positive integer), which is similar to a case shown in (a) of FIG. 16. However, it is different from the case shown in (a) of FIG. 16 in that the important data c is arranged into top k tracks (k<n) 21-1, ..., 21-k, 22-1, ..., (22-k), 23-1, (23-k), . . . of respective n tracks and the head 24 may use any normal magnetic head.

The data arranging circuit 103 outputs the recording data d in which the normal data b and the important data c are arranged so that the important data c is recorded into the top k tracks of the n tracks as described above and the normal data b is recorded into the other tracks.

Arrangement of the important data c as explained above makes it possible that reliable data can be selected from reproduced data and high speed-reproduced picture with higher picture quality than a case shown in FIG. 16 can be obtained, so that error correction ability the same level as that in the normal reproduction can be provided.

In addition, sequential top k tracks of the n tracks were used for arranging the important data, but not limited thereto, sequential arbitrary k tracks of the n tracks may be used.

Also, in this embodiment, the important data was arranged into k tracks and the normal data was arranged into the other (n-k) tracks, but not limited thereto, the important data may be arranged into one part of each track and the normal data may be arranged into the other part of each track and the other (n-k) tracks.

In addition, in a case that the video signal recording and reproducing apparatus is mechanized so that plural heads simultaneously scan, explanations will be omitted due to the fact that it operates similarly excepting that k tracks are selected in accordance with a number of heads.

Next, explanations will be made on the recording/reproduction control circuit 111.

Figure 10:
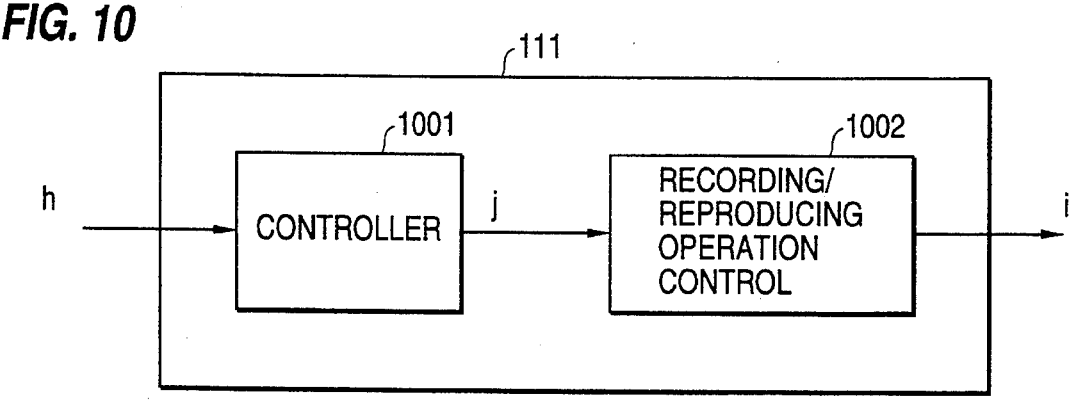
FIG. 10 is a block diagram of a recording/reproduction control circuit shown in the second embodiment.

FIG. 10 is a block diagram of the recording/reproduction control circuit 111, in which 1001 is a controller, 1002 is a recording/reproduction operation control circuit and j is a mode control signal. The controller 1001 outputs the mode control signal j to the recording/reproduction operation control circuit 1002 in response to the mode signal h that is inputted. The recording/reproduction operation control circuit 1002 outputs the control signal i to control recording and reproduction mechanism in response to the mode control signal j.

The operation of the recording/reproduction control circuit 111 described as above will be explained below.

Operation of the recording/reproduction control circuit 111 that records the digital signal as explained by referring to FIG. 16 and reproduces the digital signal thus recorded will be explained below.

If the recording and reproduction mechanism including a head 14 is controlled so that the head 14 scans the tracks 11-1, 12-1, 13-1, . . . during the high speed reproduction, the recording/reproduction control circuit 111 can positively hold the digital data on the tracks. As a result, at least the important data c can be positively held, and the high picture quality can be realized during the high speed reproduction at any speed.

Figure 17:
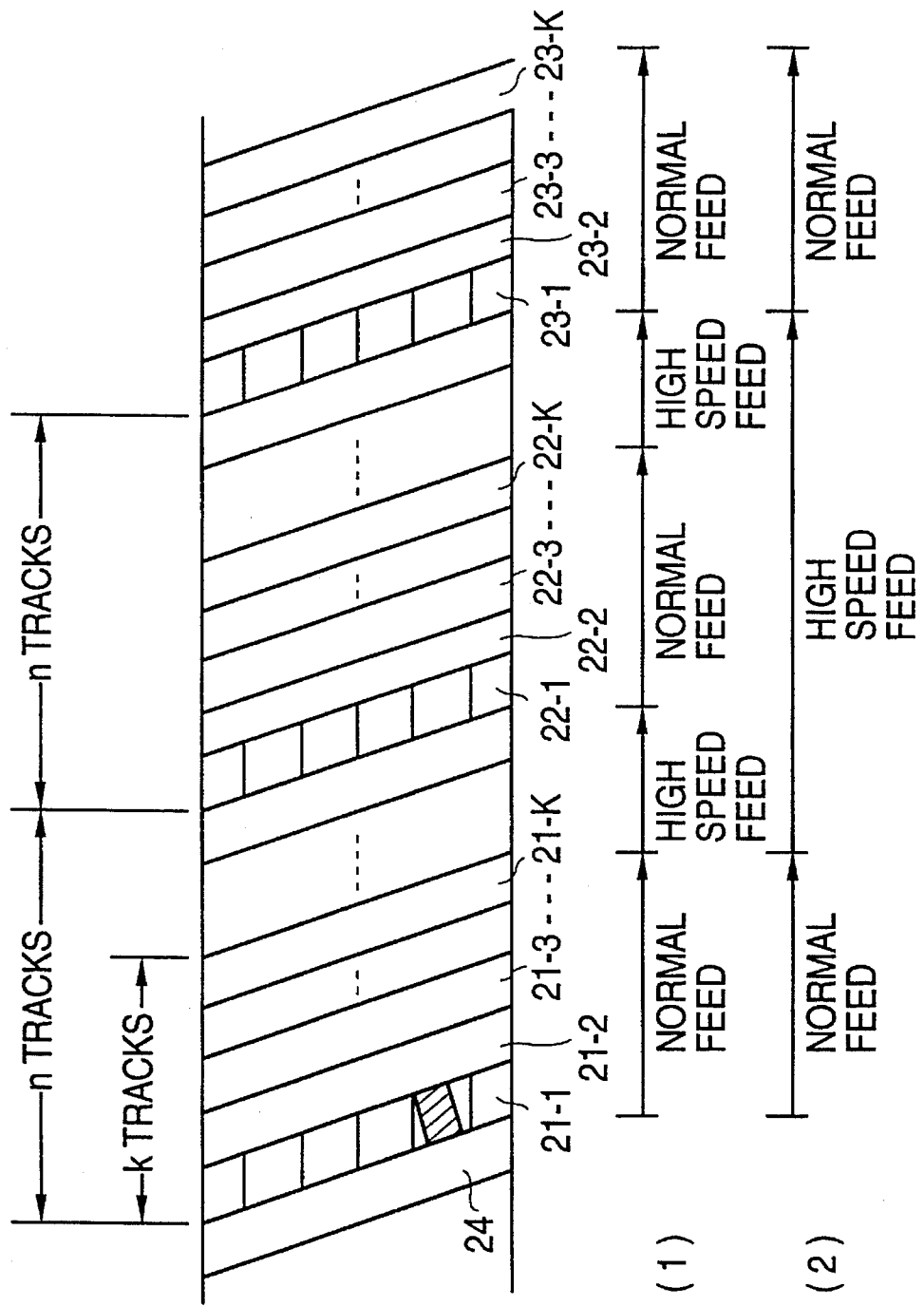
FIG. 17 is another arrangement diagram of the data recorded on the tape of the second embodiment of this invention.

Next, operation of the recording/reproducting control circuit 111 that records data in the tracks as shown in FIG. 17 explained above and reproduces recorded data will be explained below.

If the important data c is arranged as shown in FIG. 17, the magnetic recording medium is, as shown in (1), intermittently run at normal speed for the k tracks and at high speed for the other (n-k) tracks. Accordingly, reliable data can be selected from obtained digital data, high speed-reproduced picture with the higher picture quality can be provided, and the error correction ability can be obtained at the same level as that in the normal reproduction.

In addition, any high speed reproduction becomes possible by selecting speed of the high speed reproduction or high speed feed time as shown in (2).

Further in addition, when a feed speed of the head and a feed speed of the recording medium are simultaneously controlled so as to become ±m times those in the normal reproduction and m is selected as an arbitrary valve, any speed of the high speed reproduction becomes possible.

Also, in case of using such a recording and reproduction mechanism that plural heads simultaneously scan the tracks, operation is the same excepting that k tracks are selected in accordance with the number of heads, and explanations thereon will be omitted here.

With the video signal recording and reproducing apparatus as explained above, at least the important data can be reproduced during the high speed reproduction, and the high speed-reproduced picture with the higher picture quality can be obtained.

Also, the explanations were made in the first and second embodiments on the case that the important data is recorded for the high speed reproduction use, but not limited thereto, in case that a part of one picture is intra-picture coded circularly, data thus intra-picture coded circularly may be recorded for the high speed reproduction use. For example, FIG. 18 shows a case that a picture is divided transversally into four sub-pictures to be intra-picture coded circularly, in which parts not shaded show inter-picture coded parts and the shaded parts show intra-picture coded parts. As a result, for the high speed reproduction use, by recording only the shaded parts of each picture into positions reproduceable in the high speed reproduction, only the important data can be reproduced.

Also, explanations were made in the first and second embodiment on a case that data amount is constant in a period unit of the refresh picture, but not limited thereto, the first and second embodiment can be applied for a case that the data amount is changed.

In addition, though not explained in the first and second embodiment, in order that the recorded data for the high speed reproduction use is correctly reproduced, an output signal may be formed by adding a header or a dummy data for controlling the data amount if necessary so that reproduced data can be correctly decoded through a decoder of ATV, MPEG or the like.

Next, in the first and the second embodiments, examples of the important data generator 112 and the important data processing circuit 102 will be described in detail.

Figure 3:
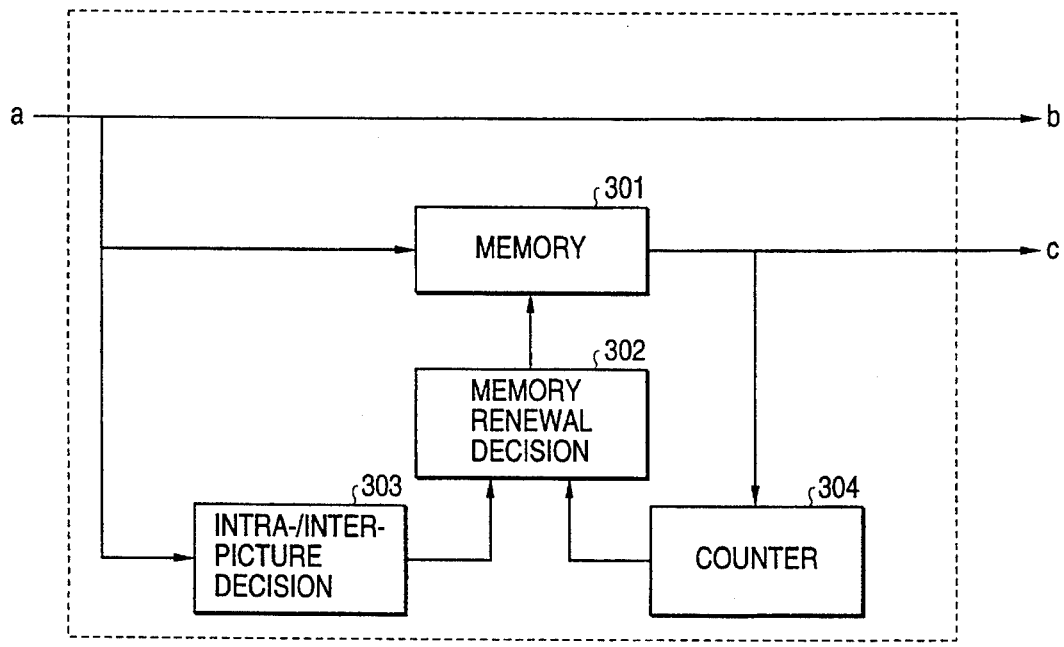
FIG. 3 is a block diagram showing a first example of an important data generating circuit in the first embodiment.

FIG. 3 is a block diagram showing a first example of the important data generator 112 in the first embodiment of this invention. In FIG. 3, a reference numeral 303 is an intra-/inter-picture decision circuit, 304 is a counter, 302 is a memory renewal decision circuit, and 301 is a memory.

Operation of the first example of the important data generator as above will be explained below.

The digital coded data a is so formed that one picture is entirely intra-picture coded (the picture data of which is hereinafter called refresh data) or at least one picture includes inter-picture coded data. In the case of the high speed reproduction, since only a part of recorded data can be reproduced, it becomes difficult that a decoded picture decodes necessary inter-picture coded data when decoding. As a result, by recording the refresh data as the important data so as to be entirely reproduced during the high speed reproduction, the picture quality can be improved.

The digital coded data a is judged through the intra-/inter-picture decision circuit 303 whether to be of a refresh data or not, then judged result is commanded to the memory renewal decision circuit 302. The memory 301 stores the digital coded data of a picture that is commanded through the memory renewal decision circuit 302, and thus stored data thereof is outputted as the important data c.

On the other hand, a number of data of an output of the memory 301 is counted through the counter 304 and sent to the memory renewal decision circuit 302. The memory renewal decision circuit 302 compares a number of data obtained through the counter 304 with a predetermined value and when the number of the data exceeds the predetermined value, sends a command to the memory 301 so as to store the data for one picture of a next refresh picture. In addition, the predetermined value to be compared with the number of the data of the counter 304 through the memory renewal decision circuit 302 is more than total data amount for one picture stored in the memory 301 at that time and as a result, if an output of the memory 301 can be recorded and all data thereof can be reproduced, one picture can be correctly formed.

Figure 4:
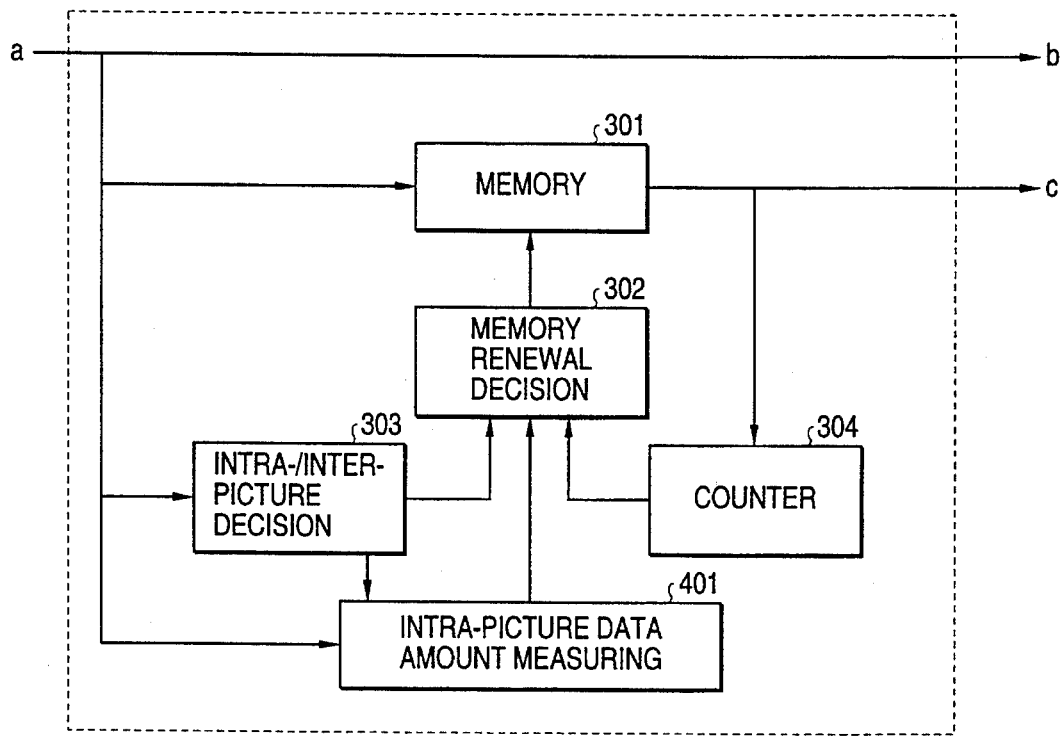
FIG. 4 is a block diagram showing a second example of the important data generating circuit in the first embodiment.

Also, the total data amount for such one picture can be obtained by measuring amount of intra-picture coded data through the intra-/inter-picture decision circuit 304, however, an intra-picture data amount measuring circuit 401 may be provided as the second example as shown in FIG. 4. The intra-picture data amount measuring circuit 401 measures data amount between a first data position and a last data position when entirety of the picture is judged as to be intra-picture coded through the intra-/inter-picture decision circuit 303 with the signals showing the first data position and the last data position as a trigger and sends a command to the memory renewal decision circuit 302.

Figure 5:
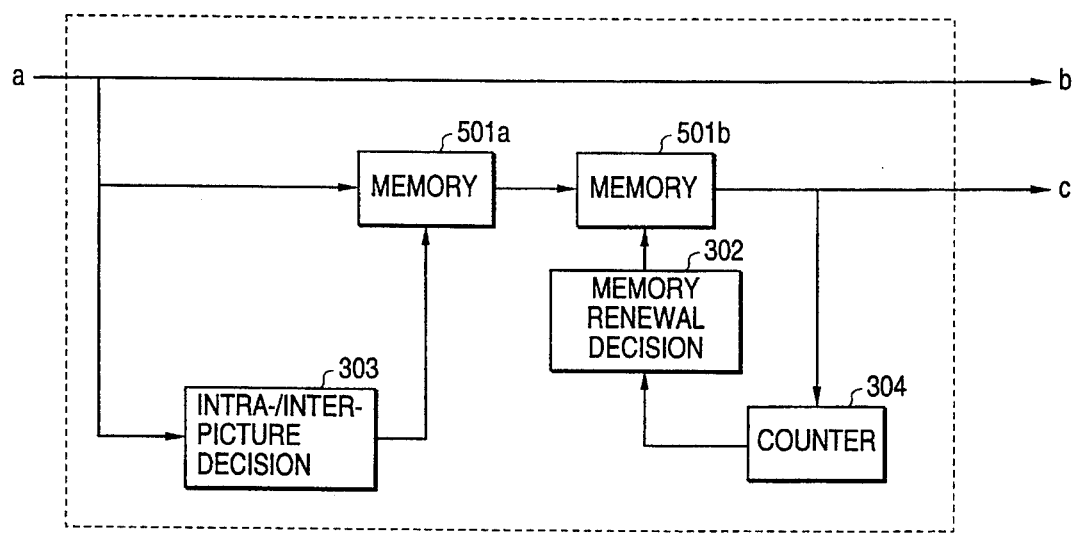
FIG. 5 is a block diagram showing a third example of the important data generating circuit in the first embodiment.

FIG. 5 is a block diagram showing a third example of the important data generator in the first embodiment of this invention, in which 303 is an intra-/inter-picture decision circuit, 304 is a counter, 302 is a memory renewal decision circuit, and 501a and 501b are memories.

Operation of the third example of the important data generator described as above will be explained below. The third example features in structure that the two memories 501a and 501b are provided differently from the first example having one memory as shown FIG. 3.

The digital coded data a is judged through the intra-/inter-picture decision circuit 303 whether to be the refresh data or not and if judged as of the refresh data, the intra-/inter-picture decision circuit 303 sends a command to a memory 501a so as to store the digital coded data for one picture.

On the other hand, the content of the memory 501a is transmitted to a memory 501b at a time point when a command is outputted from the memory renewal decision circuit 302, and data is outputted from the memory 501b as the important data c. At the same time, a number of the data of an output of the memory 501b is counted through the counter 304 and sent to the memory renewal decision circuit 302. The memory renewal decision circuit 302 compares the number of the data obtained through the counter 304 with a predetermined value and when the number of the data exceeds the predetermined value, outputs a command so as to transmit the data for one picture on a nearest time stored in the memory 501a to the memory 501b.

In addition, similar to a case of the first example, the predetermined value compared with a counted value through the counter 304 through the memory renewal decision circuit 302 is more than the total data amount for one picture stored in the memory 501a at that time and as a result, if an output of the memory 501a can be recorded and all the data thereof can be reproduced, one picture can be correctly formed. The third example features that the data to be recorded next for the high speed reproduction use has been already stored in the memory 501a and the important data can be switched to data of a next picture instantaneously at the time when the counted value through the counter 304 exceeds the predetermined value. In the first example, even if the counted value through the counter 304 exceeds the predetermined value, a content of the memory 301 cannot be renewed until the next picture having entirely intra-picture coded is inputted, so that data of the same picture are repeatedly recorded for the high speed reproduction use for a little while.

As explained above, according to the third example, by providing the memories 501a and 501b, the important data can be switched instantaneously when the counted value through the counter 304 exceeds the predetermined value.

Figure 6:
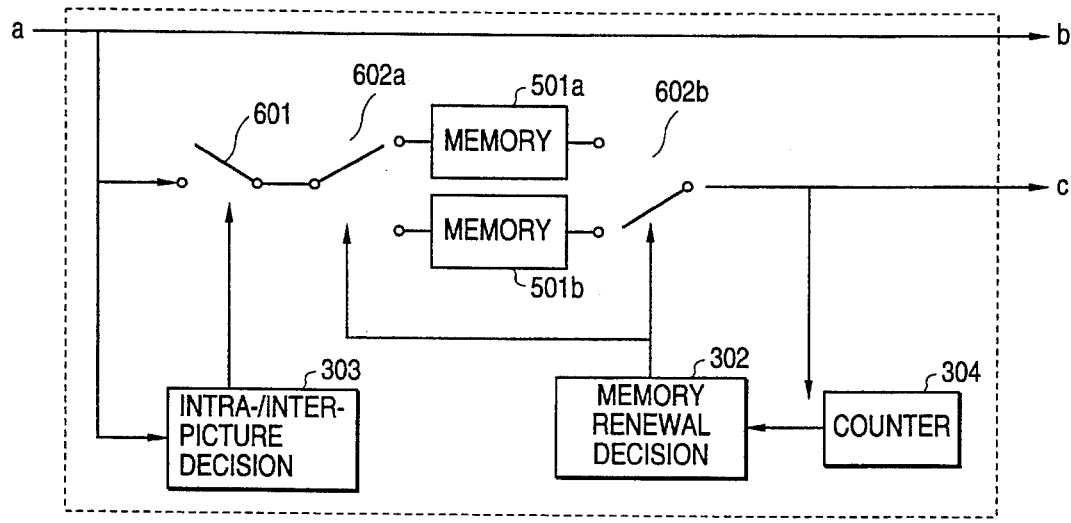
FIG. 6 is a block diagram showing a fourth example of the important data generating circuit in the first embodiment.

FIG. 6 is a block diagram showing a fourth example of the important data generator in the first embodiment of this invention, in which transmission of data from the memory 501a to the memory 501b is not needed as in a case of the third example shown in FIG. 5.

In FIG. 6, 601 is a switch to change the connection state thereof in response to an output of the intra-/inter-picture decision circuit 303, and 602a and 602b are switches each changing connection state thereof in response to an output of the memory renewal decision circuit 302.

Operation of the fourth example of the important data generator described as above will be explained below.

First, the switch 601 is turned ON only when the digital coded data a is the refresh picture and sends the refresh picture to the switch 602a. Namely, the inter-picture coded data is not stored in the memory 501a and the memory 501b. The switch 602a and the switch 602b are operably interlocked such that when the switch 602a is connected to the memory 501a, the switch 602b is connected to the memory 501b and when the switch 602a is connected to the memory 501b, the switch 602b is connected to the memory 501a. When the switch 602a is connected to the memory 501a, the intra-picture coded data of the digital coded data a is stored in the memory 501a and at the same time, the intra-picture coded data of a previous picture read out from the memory 501b is outputted as the important data. The counter 304 counts data amount outputted from the switch 602b and sends counted value to the memory renewal decision circuit 302. The memory renewal decision circuit 302 simultaneously switches the switch 602a and switch 602b when the counted value through the counter 304 exceeds a predetermined value to connect an output of the switch 601 to the memory 501b thereby to output an output of the memory 501a as the important data. When the data amount outputted from the switch 602b exceeds the predetermined value, the switch 602a and switch 602b are switched again.

As explained above, the fourth example makes it possible to provide the same operation as in a case of the third example shown in FIG. 5 without transmitting data from the memory 501a to the memory 501b as in the third example shown in FIG. 5. In addition, if the switch 602a is switched abruptly during storing the digital coded data into the memory 501a or the memory 501b, content of data being stored in the memory 501a or the memory 501b may be damaged. In order to prevent it from being damaged, after switching the switch 602b, the switch 602a may be switched at a time point when the data for one picture is finished storing in the memory 501a or the memory 501b.

Also, explanations were made on the case that the memory renewal decision circuit 302 outputs a command when the counted value through the counter 304 exceeds the total data amount for one picture stored in the memory 501 at the time point, but not limited thereto, the picture quality of the high speed reproduction can be improved by making the counted value of an integer multiple more than twice the total data amount stored in the memory 501. Namely, the same data is recorded at least into two positions as the important data as shown in FIG. 12. As a result, a number of pictures that can be reproduced in the case of the high speed reproduction will be decreased to less than half, but a number of pixels that can be reproduced may be largely increased for a reproduceable picture.

As explained above, according to the first embodiment, the intra-/inter-picture decision circuit judges whether the digital coded data is the refresh picture or not, the counter counts a number of the important data and the memory renewal decision circuit fetches the intra-picture coded data to output as the important data, resulting in an improvement in the picture quality of the high speed reproduction.

Figure 7:
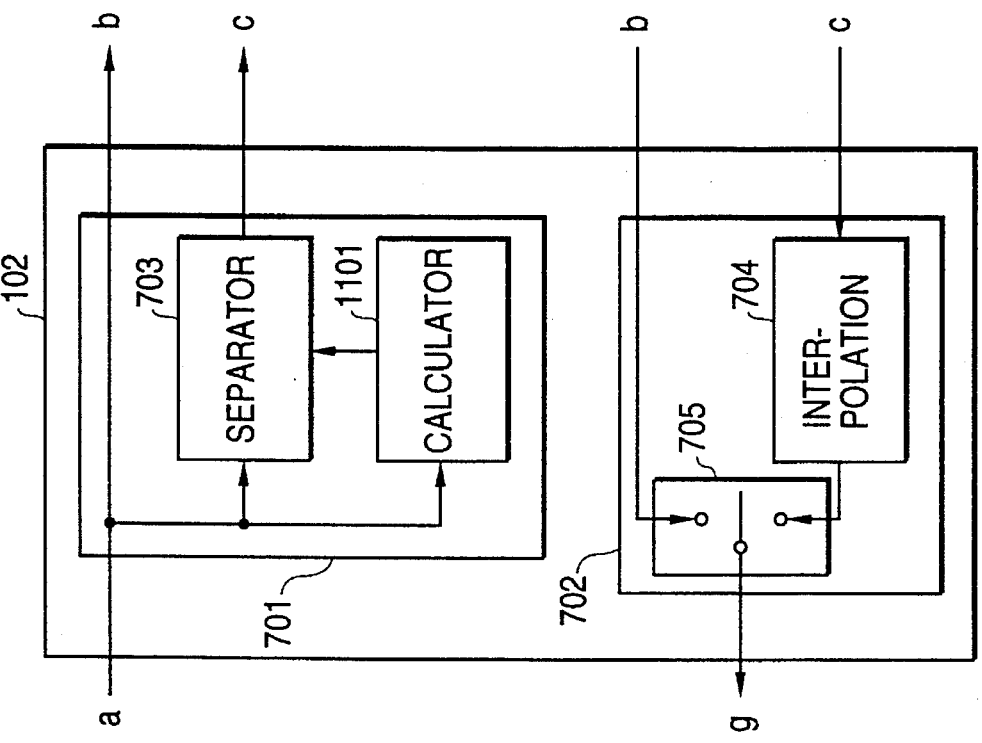
FIG. 7 is a block diagram showing a first example of an important data processing circuit in the second embodiment.

FIG. 7 is a block diagram showing a first example of the important data processing circuit in the second embodiment of this invention.

In FIG. 7, 701 is an important data generator and 702 is a reproduced data generator. The important data generator 701 has a separator 703 for separating the important data c from the digital coded data a, and a calculator 1101. The reproduced data generator 702 has an interpolation circuit 704 and a switching circuit 705.

The operation of the important data processing circuit described as above will be explained below.

When recording, the digital coded data a inputted from the terminal 101 is supplied to the important data generator 701. The important data generator 701 outputs the digital coded data a directly as the normal data b and simultaneously supplies it to the calculator 1101 and the separator 703. The calculator 1101 calculates the data amount in a range where the important data c can be recorded in response to the digital coded data a inputted from the terminal thereby to output a calculated value to the separator 703. The separator 703 separates the important data c having the data amount in accordance with the calculated value sent from the calculator 1101 from the digital coded data a.

In addition, the calculator 1101 will be described later.

In the normal reproduction, the normal data b and the important data c are supplied to the reproduced data generator 702. The normal data b passes through the switching circuit 705 provided in the reproduced data generator 702 to be outputted as the reproduced data g. In this case, the reproduced data g is equal to the digital coded data a.

In the high speed reproduction, the interpolation circuit 704 in the reproduced data generator 702 receives and interpolates the important data c. The interpolated important data is outputted through the switching circuit 705 as the reproduced output signal g from the terminal 109.

Besides, the interpolation circuit 704 has a frame memory which stores the important data c to be read out repeatedly of a predetermined number of times.

Next, explanations will be made on effects that can be obtained when the digital coded data a is a high efficiency coded video signal.

In a case that the high efficiency coded video signal is inputted as the digital coded data a, if the refresh data is separated as the important data c when recording and the important data c is outputted when the high speed reproducing, high speed reproduced picture with the high picture quality can be obtained.

In addition, in the case that the important data c is recorded into a constant range, by separating the refresh data preferentially in the order of low frequency component of a conversion coefficient contained in the refresh data, even if only the refresh data of a part of the important data c can be recorded, the high speed reproduced picture with the high picture quality can be obtained.

Further, in case that the important data c is recorded into the constant range, even if such a refresh data that forms a central part of the picture is made the important data c, the same effects can be obtained.

As explained above, the high speed reproduced picture with the high picture quality can be obtained by separating the refresh data from the digital coded data a which is a high efficiency coded video signal as the important data.

In addition, the important data is multiplexed and recorded with the refresh data of the digital coded data, thus being capable of being highly resistant to error occurrence.

Further in addition, the explanations were made on a case that the digital coded data a is the high efficiency coded video signal, but not limited thereto, it may be an intra-frame coded video signal or any digital data.

Still further in addition, the explanations were made on a case that the important data is made of the refresh data, but not limited thereto, a video signal having a predetermined time interval or any digital data may be used for this purpose.

Also, it is needless to say that the important data generator in the important data processing circuit can be introduced into the video signal recording apparatus of the first embodiment.

Next, a second example of the important data generator 112 and the important data processing circuit 102 will be explained below.

Figure 8:
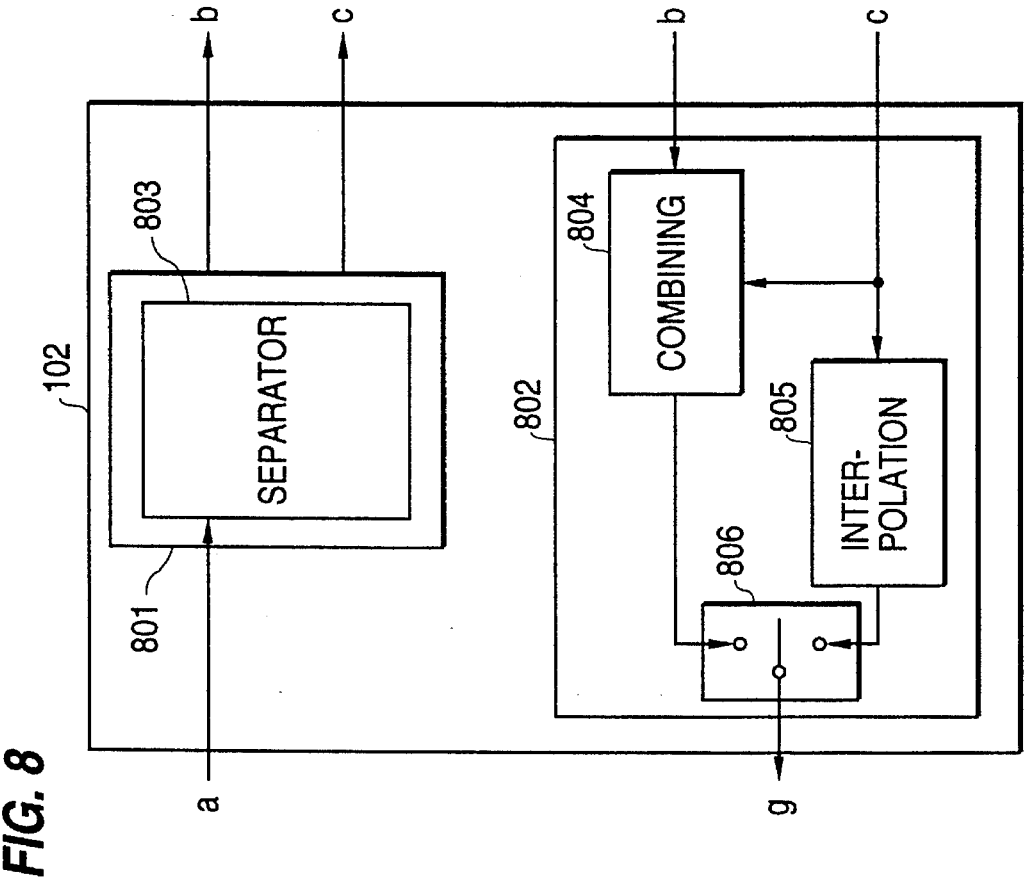
FIG. 8 is a block diagram showing a second example of the important data processing circuit in the second embodiment.

FIG. 8 is a block diagram showing a second example of the important data processing circuit in the second embodiment of this invention, in which 801 is an important data generator and 802 is a reproduced data generator. The important data generator 801 has a separator 803. The reproduced data generator 802 has a combining circuit 804, an interpolation circuit 805 and a switching circuit 806.

Operation of the important data processing circuit described as above will be explained below.

In recording, the digital coded data a inputted through the terminal 101 is supplied to the separator 803 in the pre-processing circuit 801. The separator 803 separates and outputs the digital coded data a into the important data c and the normal data b. In this case, a part or the entire of the refresh data is made the important data c, and other data than the important data is made the normal data b.

In the normal reproduction, the normal data b and the important data c are supplied to the combining circuit 804 in the reproduced data generator 802. The combining circuit 804 combines the normal data b and the important data c to obtain the reproduced data g to output through the switching circuit 806 from the terminal 109. The reproduced data g is equal to the digital coded data a.

In the high speed reproduction, at least the important data c is supplied to the interpolation circuit 805 in the reproduced data generating circuit 802. The important data c is interpolated through the interpolation circuit 805 and outputted through the switching circuit 806 from the terminal 109 as the reproduced output signal g.

In addition, the interpolation circuit 805 has a frame memory which stores the reproduced important data c to be read out repeatedly a predetermined number of times as in a case shown in FIG. 7.

As explained above, in the second example, different from the case shown in FIG. 7, the important data and the normal data are recorded without being overlapped, thus being capable of improving recording efficiency.

In addition, explanations were made on the case that the digital coded data a is the high efficiency coded video signal, but not limited thereto, it may be the intra-frame coded video signal or any digital coded data.

Further in addition, the explanations were made on the case that the important data is the refresh data, but not limited thereto, any digital data may be used for this purpose.

Still further in addition, it is needles to say that the important data generator in the important data processing circuit may be introduced into the video signal recording apparatus of the first embodiment.

In FIGS. 7 and 8, the refresh data is supposed to be a batch-refresh data, but not limited thereto, it is clear that partial refresh data may be used for this purpose. In the first and second examples, however, the important data c forms one picture by collecting pictures of frame ranges apart from each other on a time axis.

Besides, explanations were made on a case that the interpolation circuits 704 and 805 each has the frame memory, and the frame decimated by reading the reproduced important data repeatedly is interpolation-reproduced, but not limited thereto, any other structure than this may be introduced for this purpose. For example, such a processing circuit that adds coded data in which the motion amount is zero and yet, an inter-frame difference signal is zero to the refresh data, namely, such a circuit that outputs a motion compensation inter-frame coded data may be introduced for this purpose.

Figure 9:
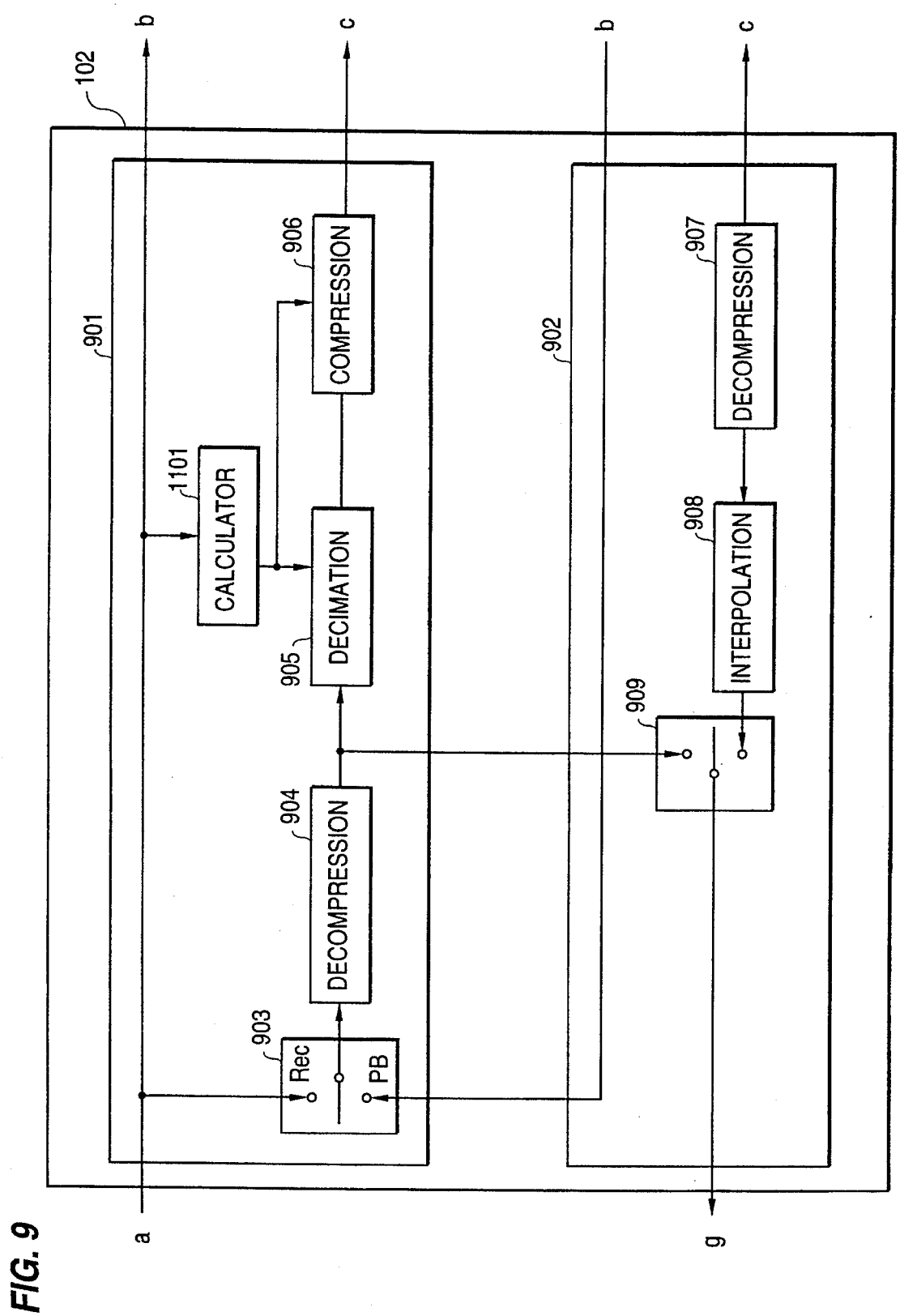
FIG. 9 is a block diagram showing a third example of the important data processing circuit in the second embodiment.

FIG. 9 is a block diagram showing a third example of the important data processing circuit in the second embodiment of this invention.

In FIG. 9, 901 is an important data generator and 902 is a reproduced data generator. The important data generator 901 has a switching circuit 903, a decompression circuit 904, a decimation circuit 905 and a compression circuit 906. The reproduced data generator 902 has a decompression circuit 907 and an interpolation circuit 908.

Operation of the important data processing circuit described as above will be explained below.

In recording, the digital coded data a is inputted to the important data generating circuit 901. On the one hand, the digital coded data a passes through the important data generating circuit 901 directly to be outputted as the normal data b. On the other hand, it is supplied to a calculator 1101 and a calculated result is supplied to the decimation circuit 905 and the compression circuit 906. Furthermore, the digital coded data a is supplied through the switching circuit 903 to the decompression circuit 904. The digital coded data a is subjected to decoding process of high efficiency coded data for broadcasting use to obtain a first video signal. The first video signal is subjected to data decimation through the decimation circuit 905 thereby to obtain a second video signal. The second video signal is subjected to data compression through the compression circuit 906 to output as the important data c. In this case, the decimation circuit 905 determines data amount of the first video signal in accordance with a calculated value outputted from the calculating circuit 1101, and the compression circuit 906 determines data amount of the second video signal in accordance with the calculated value outputted from the calculating circuit 1101.

In the normal reproduction, the important data c and the normal data b are supplied to the reproduced data generating circuit 902. The normal data b directly passes through the reproduced data generator 902 and supplied through the switching circuit 903 to the decompression circuit 904. The normal data b is decoded through the decompression circuit 904 to the first video signal to be outputted through the switching circuit 909 to the terminal 109.

In the high speed reproduction, at least the important data c is inputted to the reproduced data generator 902. The important data c is a compressed data and subjected to decoding through the decompression circuit 907 inversely to process in the compression circuit 906 thereby to become the original second video signal. In addition, the second video signal is converted through the interpolation circuit 908 into a third video signal having the same signal form as that of the first video signal. The third video signal is outputted through the switching circuit 909 to the terminal 109. As a result, in the high speed reproduction at a predetermined speed, the second video signal showing an outline of the first video signal can be observed.

The interpolation circuit 908 has a frame memory, and one frame of reproduced second video signal is stored thereinto to be read out repeatedly a predetermined number of times thereby to interpolate frames decimated when recording. Namely, the second video signal becomes third video signal having the same signal form as that of the first video signal.

The reason why the second video signal is compressed to be recorded is to decrease data length thereof and improve the recording efficiency.

In addition, when the digital coded data a from the terminal 101 is to be seen as soon as possible, it is supplied through the switching circuit 903 to the decompression circuit 904 to be decoded thereby to obtain the first video signal through the switching circuit 909 from the terminal 109.

As explained above, the third example of the important data processing circuit generates the second video signal showing the outline of the first video signal to be recorded, and even in the high speed reproduction, can reproduce the outline (the second video signal) of the first video signal. The second video signal is compressed and recorded by applying high efficiency coding for the high speed reproduction use and as a result, the data amount thereof can be reduced and reduction of recording efficiency due to the fact that a signal showing the outline of the first video signal is recorded can be made small.

In addition, with the third example, it is good only that the digital coded data a is recorded almost directly. As a result, in order to respond to any digital coded data a different in coding method, a large modification is not needed excepting that the decompression circuit 904 is to be changed.

In the above-mentioned example, the second video signal was generated through frame decimation, but not limited thereto, it can be generated through pixel decimation. Furthermore, the frame decimation and the pixel decimation can be used in combination. For example, the first video signal can be a high definition signal and the second video signal can be a video signal of an existing television, then a compressed high definition signal (about 20 Mbps according, for example, to ATV considerations in the United States) can be recorded by a digital VCR utilizing the video signal (according to an academic report, compressed up to a degree of ¼–⅛ and recorded, about 25 Mbps in recording data rate) of the existing television. In this case, the second video signal is recorded at a rate of about 5 Mbps (=25–20). Compression of the existing television can be performed through a small number of circuits if the compression circuit is employed. In addition, if the recording efficiency is permitted to be decreased, it is needless to say that the compression circuit 906 may be removed from the important data generating circuit 901 and the decompression circuit 907 may be removed from the reproduced data generating circuit 902.

Next, operation of the calculator 1101 will be explained below.

Figure 11A:
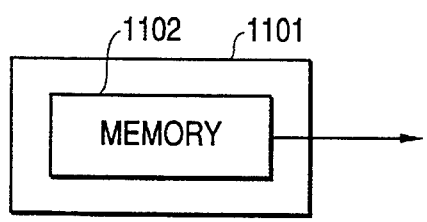
FIGS. 11(a), 11(b) and 11(c) are block diagrams of a calculator circuit in each of the first and second embodiments of this invention.
Figure 11B:
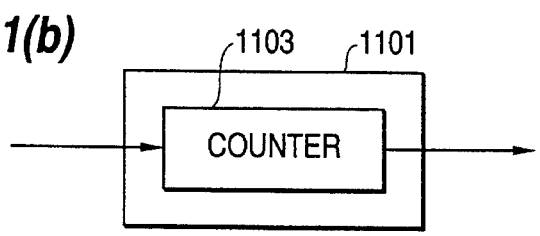
Figure 11C:
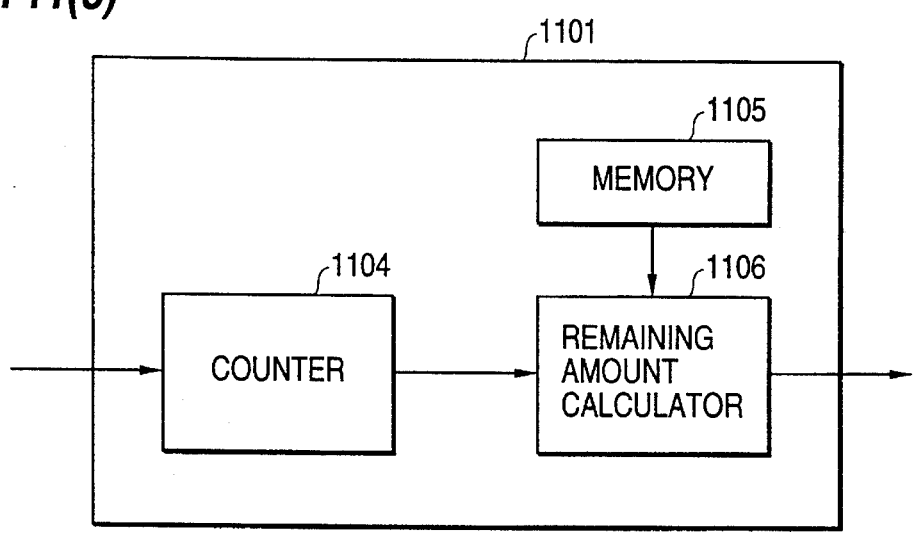

In (a) of FIG. 11, 1102 is a memory.

The operation of the calculator 1101 shown in (a) of FIG. 11 will be explained first.

In a case that a size of a range where the important data c is to be recorded is constant, the calculator 1101 may be formed of the memory 1102 not having an input. The memory 1102 stores an amount of data in the range where recording can be made. In recording, the calculator 1101 outputs values at a period of n tracks.

In (b) of FIG. 11, 1103 is a counter.

The operation of the calculator 1101 described as above will be explained.

The counter 1103 has the data amount that can be recorded into n tracks as an initial value. The counter 1103 is supplied with the normal data b in general. The counter 1103 counts data so as to subtract a value of the normal data b from the initial value and outputs the value at a time point when the input of the normal data b is finished to the calculator 1101. In recording, this operation is carried out at a period of n tracks.

In (c) of FIG. 11, 1104 is a counter, 1105 is a memory, and 1106 is a remaining amount calculator.

The operation of the calculator 1101 described as above will be explained.

The memory 1105 stores the data amount that can be recorded into n tracks and outputs a value thus stored to the remaining amount calculator 1106. The counter 1104 counts the value of the normal data b inputted thereinto and outputs a counted value to the remaining amount calculator 1106. The remaining amount calculator 1106 subtracts the counted value obtained by the counter 1104 from a value outputted from the memory 1105 to output at the time point when an output of the counter 1104 is finished. In recording, this operation is carried out at a period of n tracks.

Figure 20:
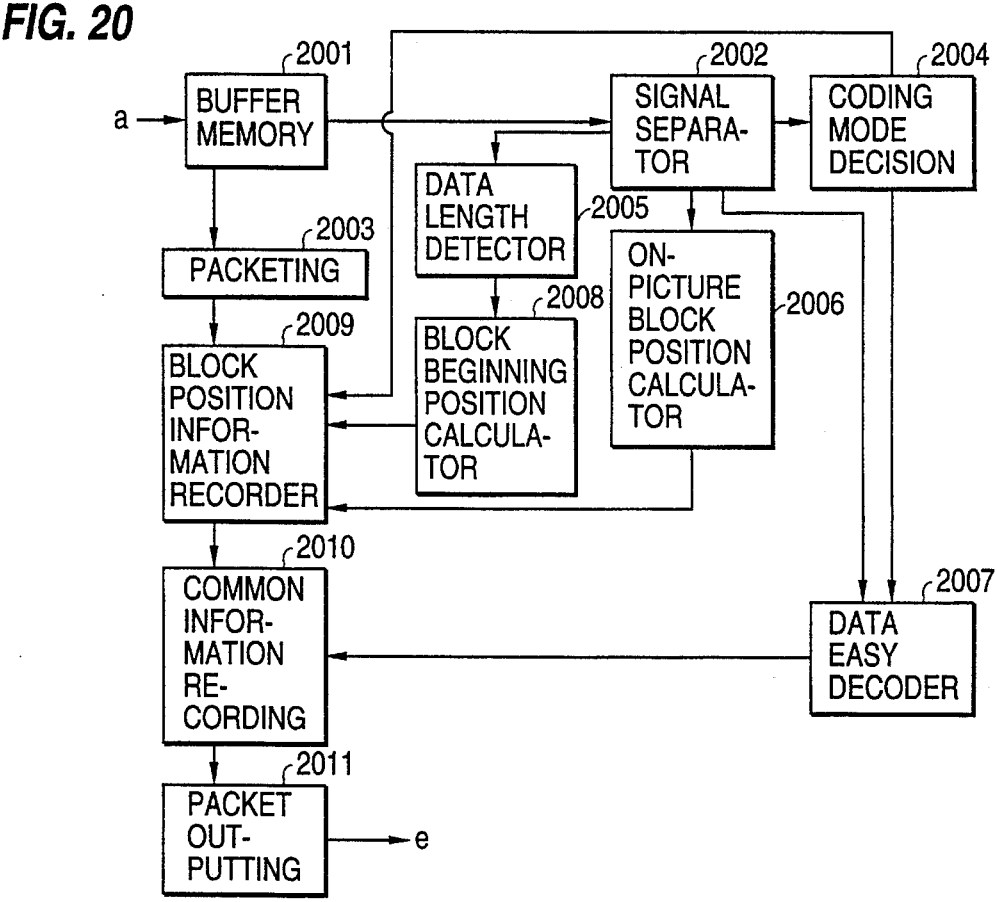
FIG. 20 is a block diagram of a video signal recording apparatus of a third embodiment of this invention.
Figure 22:
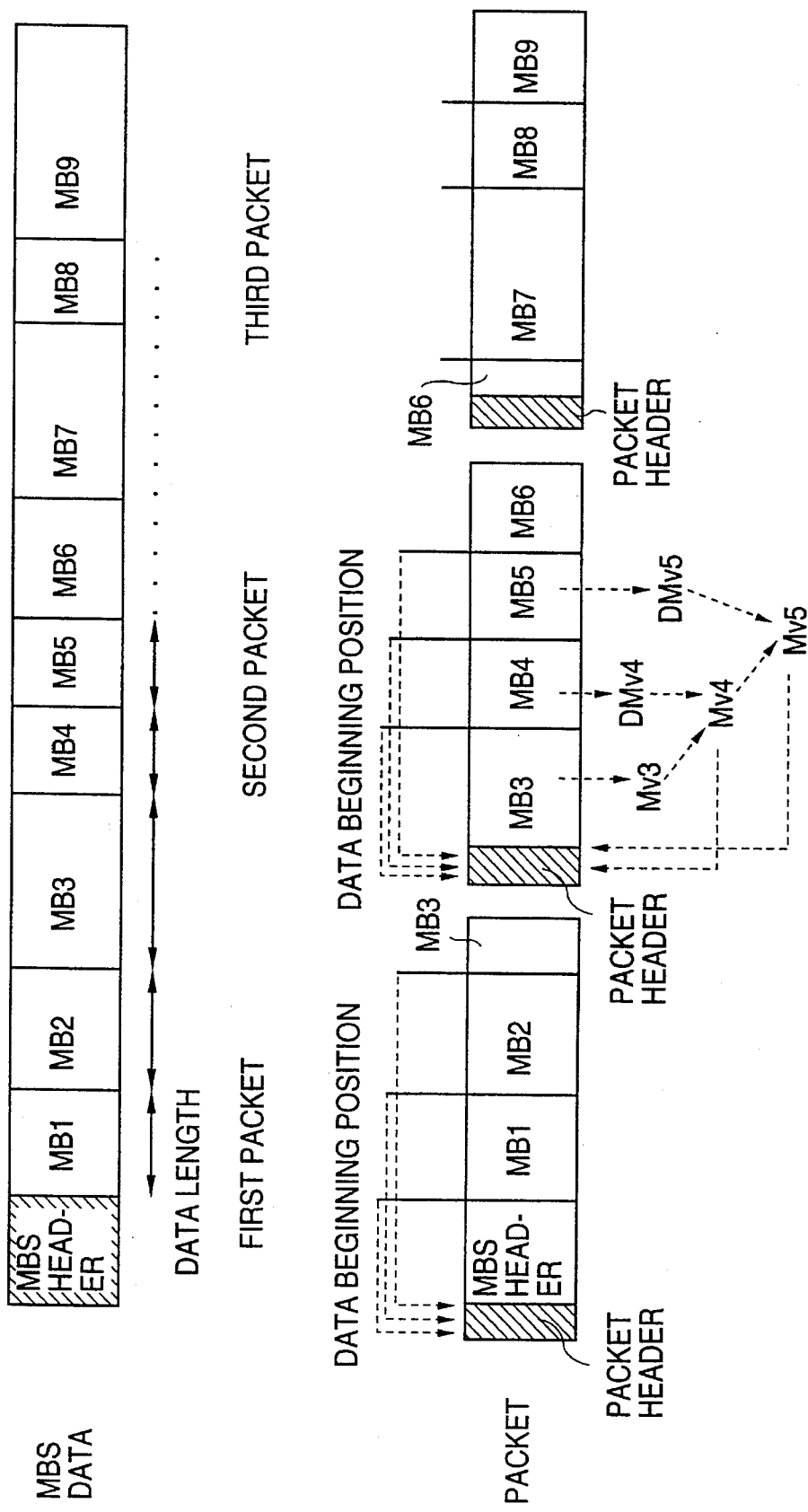
FIG. 22 is a diagram showing a structure of packeted data by the video signal recording apparatus as shown in the third embodiment.

FIG. 20 is a block diagram of a video signal recording apparatus of a third embodiment of this invention, and FIG. 22 is a diagram showing a structure of a packeted data.

The a is sent to a buffer memory 2001 and an output of the buffer memory 2001 is supplied to a signal separator 2002 and a packeting circuit 2003. An output of the signal separator 2002 is supplied to a coding mode decision circuit 2004, a data length detector 2005, an on-picture block position calculator 2006 and a data easy decoder 2007. An output of the coding mode decision circuit 2004 is supplied to the data easy decoder 2007 similar to an output of the signal separator 2002. An output of the data length detector 2005 is supplied to a block beginning position calculator 2008. An output of the block beginning position calculator 2008 is supplied to a block position information recording circuit 2009 similar to a packet output of the packeting circuit 2003 and an output of the on-picture block position calculator 2006. A packet output having added a macro-block position information through the block position information recording circuit 2009 is supplied to a common information recording circuit 2010 similar to an output of the data easy decoder 2007. An output of the common information recording circuit 2010 is supplied to a packet outputting circuit 2011.

Operation of the video signal recording apparatus described as above will be explained below.

The digital coded data a is a coded signal in which an essential information to decode a direct current component in an intra-picture coded block or a motion vector in an inter-picture coded block is differentially coded for every block through performing intra-/inter-picture adaptive quantization and variable length coding in a block unit.

Such digital coded data a is stored into the buffer memory 2001 and read out in the order of entrance through the signal separator 2002 thereby to be separated into common information written into upper hierarchical headers such as Macro-Block Slice (MBS) which is a unit that a coded signal of each macro-block and plural macro-blocks are collected according to hierarchical data structure of the digital coded data. The data length of the coded signal of each macro-block separated through the signal separator 2002 is detected through the data length detector 2005. Also, the coding mode decision circuit 2004 reads and decodes a decision bit for selecting an intra-picture coding mode or an inter-picture coding mode from a header of the coded signal of each macro-block thereby to decide a coding mode of each macro-block. In addition, a position of each micro-block on the picture is obtained through the on-picture block position calculator 2006 depending on a number of MBSs and a number of macro-blocks previously processed during each micro-block. The data each decoder 2007 reads and decodes the information bit of the motion vector from the coded signal when the coding mode of the macro-block is the inter-picture coding mode.

The packeting circuit 2003 sequentially divides the input signal into packets having a predetermined number of bits as shown in FIG. 22. On a top of each packet is added a header showing a beginning of a packet. In the header is also recorded any auxiliary information necessary for reproduction decoding. The block beginning position calculator 2008 calculates a data beginning position of each macro-block in each packet by using the data length of each macro-block coded signal detected through the data length detector 2005. The block position information recording circuit 2009 records both a position information of each macro-block of a packet obtained through the block beginning position calculator 2008 and the position information of each macro-block on the picture obtained through the on-picture block position calculator 2006 into the header of the packet in which the macro-block is contained.

The motion vector of each macro-block decoded and obtained through the data easy decoder 2007 is recorded into a header of the packet in which such macro-block is contained through the common information recording circuit 2010 as in a case of the position information. For example, a motion vector Mv5 in a fifth macro-block MB5 of the MBS is, as shown in FIG. 22, coded in a form of difference DMr5 from a motion vector Mv4 in a fourth macro-block MB4.

The data easy decoder 2007 decodes the motion vector Mv5 from the motion vector Mv4 and the difference DMv5 to record into a header of the second packet. Similarly, motion vectors for macro-blocks having modes which are sequentially subjected to motion compensation coding are decoded and recorded into headers of the packets in which the macro-blocks are respectively contained. A packet signal having added the position information and common information is outputted as the recording signal e from the packet outputting circuit 2011 to be recorded into the recording medium.

Figure 21:
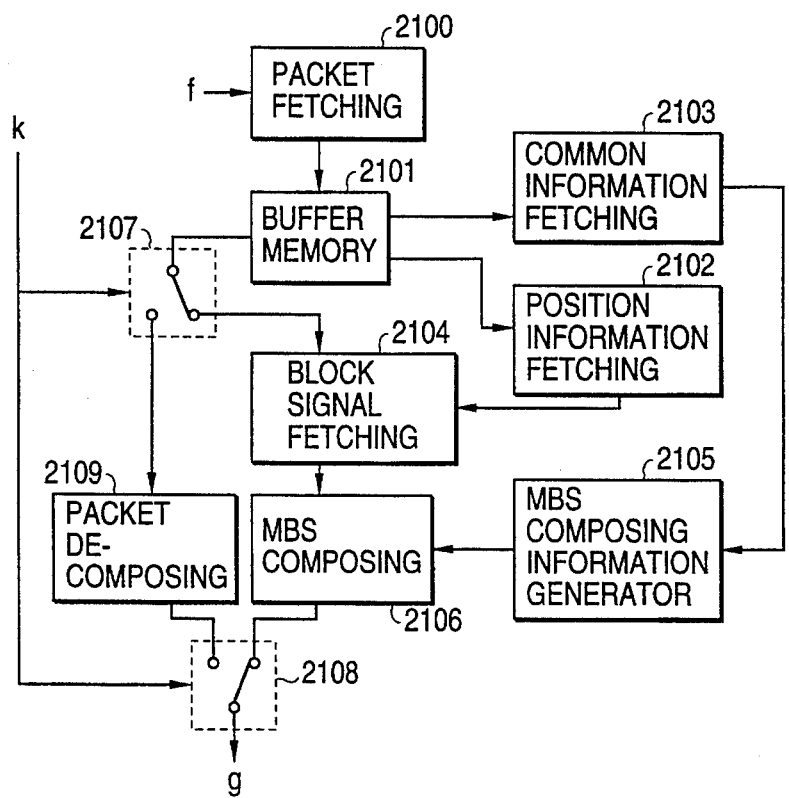
FIG. 21 is a block diagram of a video signal reproducing apparatus of a third embodiment of this invention.

FIG. 21 is a block diagram of a video signal reproducing apparatus of a third embodiment.

An output of a packet fetching circuit 2100 is supplied to a buffer memory 2101. An output of the buffer memory 2101 is supplied to a position information fetching circuit 2102, a common information fetching circuit 2103 and a switch 2107. The switch 2107 operates switching between a block information fetching circuit 2104 and a packet decomposing circuit 2109. An output of the position information fetching circuit 2102 is supplied to the block signal fetching circuit 2104 and an output of the block signal fetching circuit 2104 is supplied to a MBS composing circuit 2106. The data fetched through the common information fetching circuit 2103 is supplied to a MBS composing information generator 2105 and an output of the MBS composing information generator 2105 is supplied to the MBS composing circuit 2106. A switch 2108 operates switching between an output of the MBS composing circuit 2106 and an output of the packet decomposing circuit 2109 to output the reproduced data g outside.

The operation of the video signal reproducing apparatus described as above will be explained below.

A recorded signal in the recording medium is read out in the packet unit through the packet fetching circuit 2100 as shown in FIG. 22 to be stored in the buffer memory 2101 as the reproduced output signal f. The position information fetching circuit 2102 fetches the position information of each micro-block recorded into a header of the reproduced output signal f. The common information fetching circuit 2103 fetches a coded signal of the motion vector of each macro-block which is a coded information in order to integrate each micro-block recorded in a header of the packet of the reproduced output signal f thereby to generate MBS. The MBS composing information generator 2105 decodes the motion vector fetched through the common information fetching circuit 2103 and generates an information for forming the MBS. For example, in a case that a top packet is damaged, the MBS cannot be correctly reproduced on an entire basis previously, however, according to the third embodiment, the position information and the motion vector of each micro-block is independently recorded for every packet, so that such a MBS that has the MB4 as the top micro-block can be newly generated. Accordingly, any part where the reproduction becomes impossible and/or range where transmission becomes erroneous due to editing or the like can be minimized.

The block signal fetching circuit 2104 fetches a coded signal of each micro-block being contained in the packet in response to the position information of each macro-block of the packet fetched through the position information fetching circuit 2102. By using the micro-block position information on the picture fetched from the position information fetching circuit 2102 and the common information fetched through the common information fetching circuit 2103, the MBS composing circuit 2106 integrates the coded signal of each macro-block to generate the reproduced data g newly. The reproduced data g thus newly generated through the MBS composing circuit 2106 is outputted outside and decoded to a picture signal through a decoder which is provided outside.

In addition, when the packet was normally reproduced at the normal speed, the switches 2107 and 2108 both are switched to a side of the packet decomposing circuit 2109 in response to an external control signal k showing a fact that reproduction was made normally thereby to output the coded signal outside as the reproduced data g corrected in such a form that can be decoded.

Figure 23:
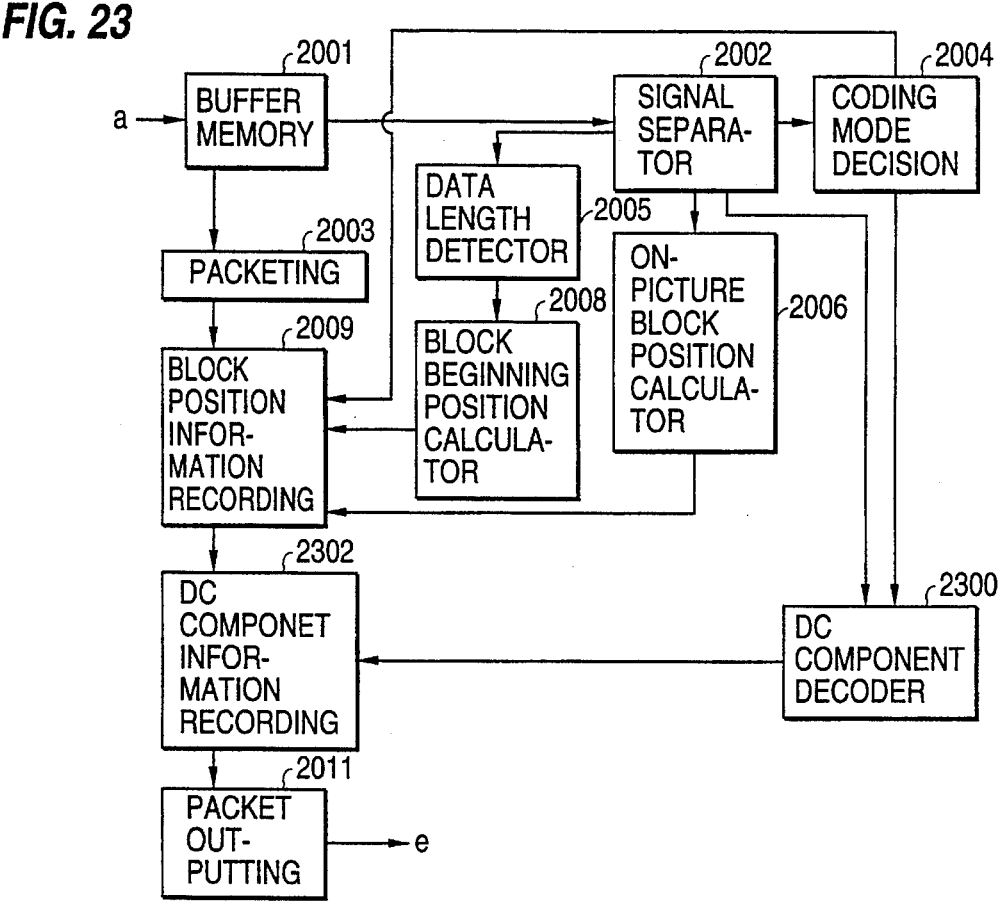
FIG. 23 is a block diagram of a video signal recording apparatus of a fourth embodiment of this invention.
Figure 25:
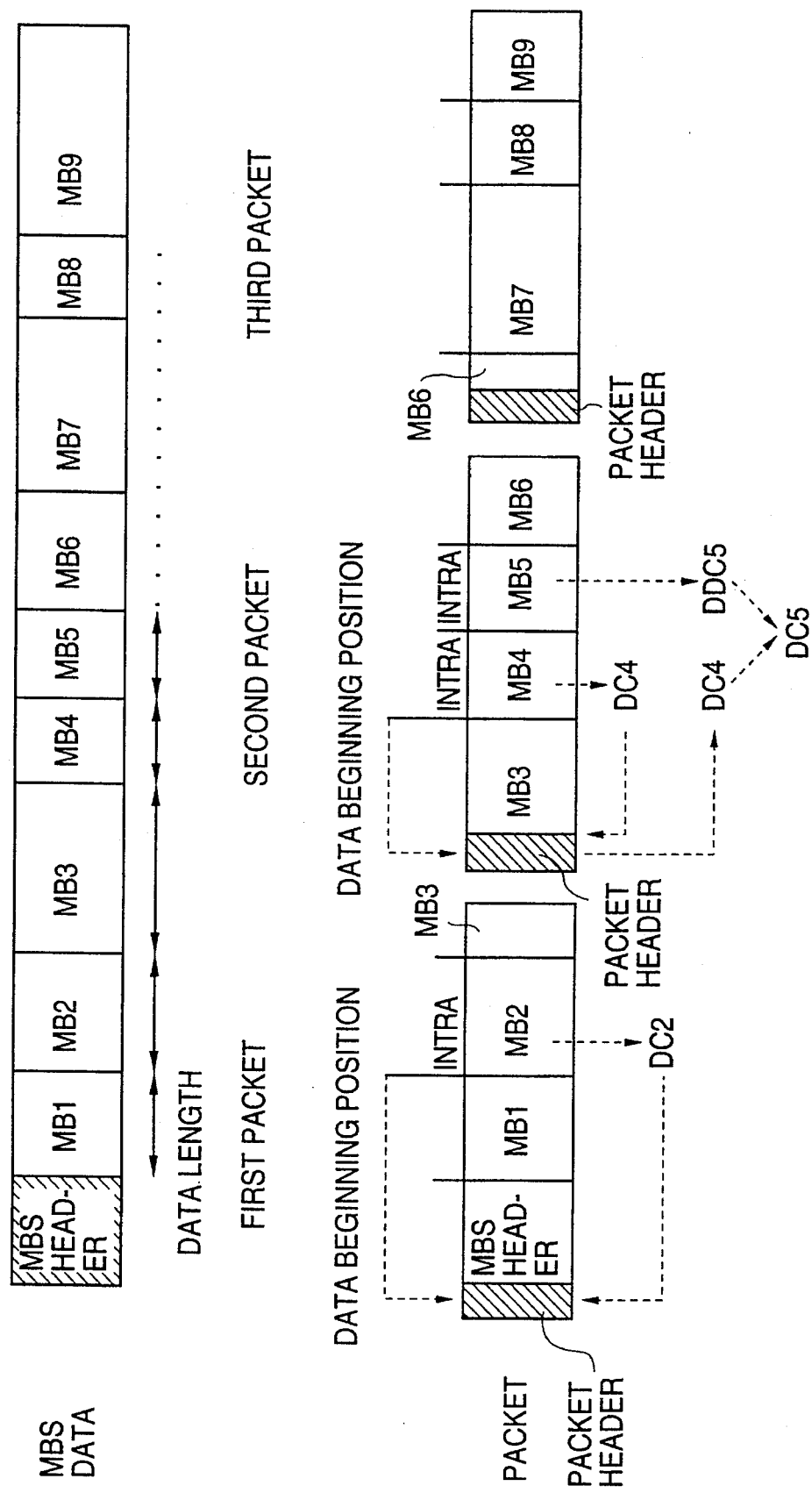
FIG. 25 is a diagram showing a structure of packeted data by the video signal recording apparatus shown in the fourth embodiment.

FIG. 23 is a block diagram of a video signal recording apparatus of a fourth embodiment of this invention, and FIG. 25 is a diagram showing a structure of packeted data.

The output of the signal separator 2002 is supplied to the coding mode decision circuit 2004, the data length detector 2005, the on-picture block position calculator 2006, and a direct current (DC) component decoder 2300. The output of the coding mode decision circuit 2004 is supplied to the DC component decoder 2300 and the block position information recording circuit 2009. The output of the block beginning position calculator 2008 is supplied to the block position information recording circuit 2007 similar to the output of the packeting circuit 2003 and an output of the on-picture block position calculator 2006. The packet output having added micro-block position information through the block position information recording circuit 2009 is supplied to a DC information recording circuit 2302 similar to an output of the DC component decoder 2300.

Operation of the recording apparatus described as above will be explained below.

The DC component decoder 2300 reads and decodes an information bit showing the DC component of intra-picture coded micro-block which is appeared first in each packet of the digital coded data a from the coded signal. The block position information recording circuit 2009 collectively records the macro-block data position information obtained through the block beginning position calculator 2008 and the on-picture position information obtained through the on-picture block position calculator 2006 in the intra-picture coded macro-block which is appeared first in each packet of the digital coded data a into the header of the packet containing that macro-block. In cases that the packet does not have an intra-picture coded macro-block and that all the macro-blocks forming the packet are of the intra-picture coding mode, the codes showing respective cases are recorded. The DC component of intra-picture coded macro-block which is appeared first in the packet obtained through the DC component decoder 2300 is recorded into the header of the packet containing that macro-block. For example, as shown in FIG. 25, the coded information of a DC component DC2 of a micro-block MB2 of the first packet and a DC component DC4 of a macro-block MB4 of the second packet are recorded respectively into the headers of the packets containing these macro-blocks.

Figure 24:
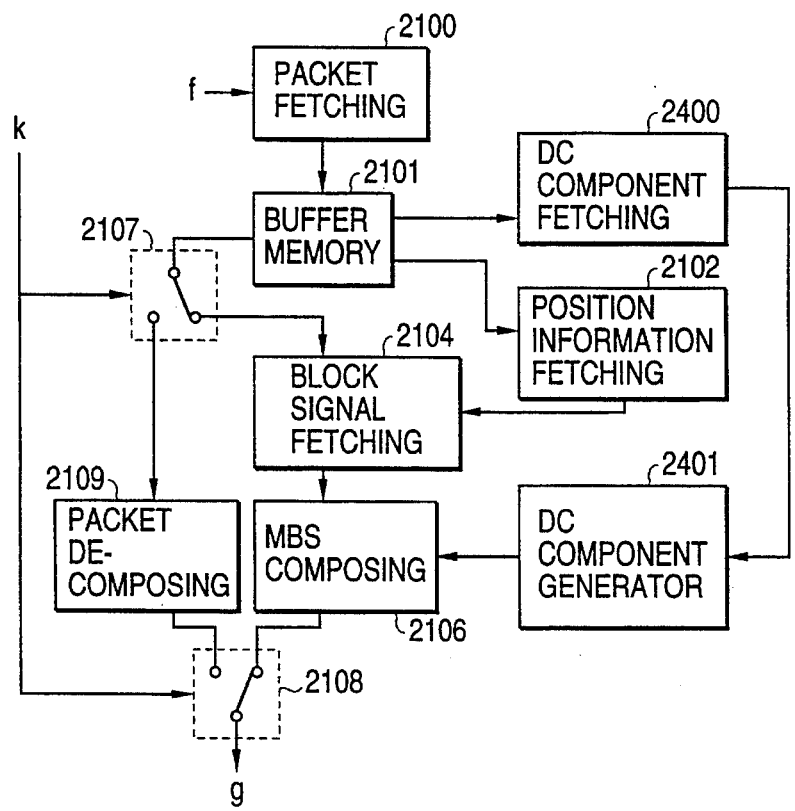
FIG. 24 is a block diagram of a video signal reproducing apparatus of the fourth embodiment of this invention.

FIG. 24 is a block diagram of a video signal reproducing apparatus of the fourth embodiment of this invention.

The output of the packet fetching circuit 2100 is supplied to the buffer memory 2101. The output of the buffer memory 2101 is supplied to a position information fetching circuit 2102, a DC information fetching circuit 2400 and the switch 2107. The switch 2107 operates switching between the output of the block signal fetching circuit 2104 and the output of the packet decomposing circuit 2109. The output of the position information fetching circuit 2102 is supplied to the block signal fetching circuit 2104. The output of the block signal fetching circuit 2104 is supplied to the MBS composing circuit 2106. Data information fetched through the DC information fetching circuit 2400 is supplied to a DC component generating circuit 2401. An output of the DC component generating circuit 2401 is supplied to the MBS composing circuit 2106. The switch 2108 operates switching between an output of the MBS composing circuit 2106 and the output of the packet decomposing circuit 2109 to supply to the outside.

The operation of the video signal reproducing apparatus structured as above will be explained below.

The DC information fetching circuit 2400 fetches a coded signal of the DC component of intra-picture coded macro-block which is appeared first in each packet recorded into the header of a packet signal. For example, in FIG. 25, it fetches DC2 and DC4.

The DC component generator 2401 decodes the DC component fetched through the DC information fetching circuit 2400. For example, in a case that the top packet is damaged, the MBS cannot be reproduced on the entire basis previously, however, according to the fourth embodiment, due to a fact that the position information and a DC component of the intra-picture coded macro-block which is appeared first in each packet are recorded independently to each other, the micro-block MB4 can be decoded. DC components of intra-picture coded macro-blocks that follow thereto can be decoded by using DC4. As a result, it becomes possible that the intra-picture coded macro-blocks are fetched and decoded independently to each other, thus being capable of improving the picture quality of the high speed reproduction. Furthermore, it becomes possible to reduce any part where reproduction cannot be made and/or any region where transmission is erroneous due to editing or the like.

Also, in a case that the packet was normally reproduced at the normal speed, the reproduced signal can be sent out outside as the reproduced data g aligned in such a form that can be decoded as in the third embodiment.

In addition, explanations were made above on the case that the common information and the position information are recorded into the header of each packet, but not limited thereto, they may be recorded into any position that is predetermined.

Further in addition, in the fourth embodiment, the block position information recording circuit 2009 and the DC information recording circuit 2002 respectively record the position information and the DC component of the intra-picture coded macro-block appeared first in each packet, but not limited thereto, they may record all or a predetermined plural number of information of each intra-picture coded macro-block which is appeared in the packet.

As described above, according to the embodiments of this invention, a recording apparatus and a reproducing apparatus can be obtained which is met to the editing, the high speed reproduction and error prevention requirements in recording a video signal in such a manner that the digital coded data a is subjected to intra-/inter-picture adaptive quantization and variable length coding in the block unit and a coded signal in which necessary information are differentially coded for every block is divided into packets each having a predetermined number of bits.

What is claimed is:

1. A video signal recording apparatus for recording on a recording medium an input coded video signal containing intra-picture coded data and inter-picture coded data, comprising:

important data generating means for generating important data from a part of the input coded video signal that contains intra-picture coded data, said important data generating means outputting the input coded video signal as is as normal data;

data arranging means for arranging said important data and said normal data in such an order that said important data is recorded in a specific area of the recording medium and said normal data is recorded in the remaining area of the recording medium; and data recording means for recording said important data and said normal data into said specific area and the remaining area, respectively, of the recording medium.

2. The video signal recording apparatus as claimed in claim 1, wherein said important data generating means includes selecting means for selecting from the input coded video signal a predetermined coded video signal containing intra-picture coded data, said predetermined coded video signal being outputted as said important data.

3. The video signal recording apparatus as claimed in claim 2, wherein said selecting means selects as the predetermined coded video signal a predetermined picture which contains intra-picture coded data.

4. The video signal recording apparatus as claimed in claim 3, wherein said selecting means selects as the predetermined coded video signal a predetermined picture which is entirely intra-picture coded.

5. The video signal recording apparatus as claimed in claim 1, wherein said important data generating means generates the important data from at least a part of an entirely intra-picture coded picture contained in the input coded video signal.

6. The video signal recording apparatus as claimed in claim 1, wherein said important data generating means generates the important data from a low frequency component coded data of an entirely intra-picture coded picture contained in the input coded video signal.

7. The video signal recording apparatus as claimed in claim 1, wherein said important data generating means generates the important data from intra-picture coded data forming a central area of a predetermined picture contained in the input coded video signal.

8. The video signal recording apparatus as claimed in claim 1, wherein said important data generating means includes calculating means for calculating a range of a recording area where said important data can be recorded in the recording medium, and determines an amount of said important data based on the thus calculated range.

9. The video signal recording apparatus as claimed in claim 1, wherein said recording means records said important data repeatedly at least two times on the recording medium.

10. The video signal recording apparatus as claimed in claim 1, wherein said recording medium is a recording tape, and wherein said recording means records said important data in areas on said recording tape which are reproducible in a high speed reproducing mode.

11. The video signal recording apparatus as claimed in claim 1, wherein said recording medium is a recording tape, and wherein said recording means records said important data in a predetermined fixed area on each of recording tracks of said recording tape.

12. A video signal recording apparatus for recording on a recording medium an input coded video signal containing intra-picture coded data and inter-picture coded data, comprising:

important data generating means for generating important data from a part of the input coded video signal that contains intra-picture coded data, said important data generating means outputting all or the remaining part of the input coded video signal as normal data;

data arranging means for arranging said important data and said normal data in such an order that said important data is recorded in a specific area of the recording medium and said normal data is recorded in the remaining area of the recording medium; and data recording means for recording said important data and said normal data into said specific area and the remaining area, respectively, of the recording medium, wherein said important data generating means comprises:

intra/inter-picture decision means for judging whether a predetermined picture contained in the input coded video signal is entirely intra-picture coded;

memory means for temporarily storing coded data of a picture commanded through a memory renewal decision means and for outputting the stored coded data as said important data;

counting means for counting a number of the coded data outputted from said memory means after renewal of a content of said memory means; and said memory renewal decision means for outputting a command to said memory means so as to store coded data of the predetermined picture when said intra/inter-picture decision means judges that the predetermined picture is entirely intra-picture coded and a counted value obtained by said counting means exceeds a predetermined value.

13. The video signal recording apparatus as claimed in claim 12, wherein said predetermined value is larger than a total data amount of coded data for a picture which is stored in said memory means.

14. The video signal recording apparatus as claimed in claim 12, wherein a period of outputting said command by said memory renewal decision means is an integer multiple of a period of occurrence of entirely intra-picture coded pictures in the input coded video signal.

15. A video signal recording apparatus for recording on a recording medium an input coded video signal containing intra-picture coded data and inter-picture coded data, comprising:

important data generating means for generating important data from such a part of the input coded video signal that contains intra-picture coded data, said important data generating means outputting all or the remaining part of the input coded video signal as normal data;

data arranging means for arranging said important data and said normal data in such an order that said important data is recorded in a specific area of the recording medium and said normal data is recorded in the remaining area of the recording medium; and data recording means for recording said important data and said normal data into said specific area and the remaining area, respectively, of the recording medium, wherein said important data generating means comprises:

intra/inter-picture decision means for judging whether a predetermined picture contained in the input coded video signal is entirely intra-picture coded;

first memory means for temporarily storing coded data of the predetermined picture which is judged by said intra-inter-picture decision means as being entirely intra-picture coded;

second memory means for storing coded data for a picture which is stored or being stored on a nearest time in said first memory means when a command is outputted from a memory renewal decision means and for outputting the coded data stored therein as said important data;

counting means for counting a number of the coded data outputted from said second memory means after renewal of a content of said second memory means; and said memory renewal decision means for outputting a command so as to transmit a content of said first memory means to said second memory means when a count value of said counting means exceeds a predetermined value.

16. The video signal recording apparatus as claimed in claim 15, wherein said predetermined value is larger than a total data amount of coded data for one picture which is stored in said first memory.

17. The video signal recording apparatus as claimed in claim 15, wherein a period of outputting said command by said memory renewal decision means is an integer multiple of a period of occurrence of entirely intra-picture coded pictures in the input coded video signal.

18. A video signal recording apparatus for recording on a recording medium an input coded video signal containing intra-picture coded data and inter-picture coded data, comprising:

important data generating means for generating important data from a part of the input coded video signal that contains intra-picture coded data, said important data generating means outputting all or the remaining part of the input coded video signal as normal data;

data arranging means for arranging said important data and said normal data in such an order that said important data is recorded in a specific area of the recording medium and said normal data is recorded in the remaining area of the recording medium; and data recording means for recording said important data and said normal data into said specific area and the remaining area, respectively, of the recording medium, wherein said important data generating means comprises:

intra/inter-picture decision means for judging whether a predetermined picture contained in the input coded video signal is entirely intra-picture coded;

first and second memory means arranged in parallel, each of said first and second memory means being operable in an operating mode which is one of a storing mode for temporarily storing coded data of the predetermined picture which is judged by said intra/inter-picture decision means as being entirely intra-picture coded and an outputting mode for outputting coded data stored therein as said important data, said first and second memory means operating in such a manner that one of said first and second memory means operates in the storing mode and the other operates in the outputting mode;

counting means for counting a number of the coded data outputted from one of said first and second memory means after renewal of a content of said one of said first and second memory means; and memory renewal decision means for outputting a command so as to change the operating mode of each of said first and second memory means from one of the storing mode and the outputting mode to the other when a count value of said counting means exceeds a predetermined value.

19. A video signal recording apparatus for recording on a recording medium an input coded video signal containing intra-picture coded data and inter-picture coded data, comprising:

important data generating means for generating important data from a part of the input coded video signal that contains intra-picture coded data, said important data generating means outputting all or the remaining part of the input coded video signal as normal data;

data arranging means for arranging said important data and said normal data in such an order that said important data is recorded in a specific area of the recording medium and said normal data is recorded in the remaining area of the recording medium; and data recording means for recording said important data and said normal data into said specific area and the remaining area, respectively, of the recording medium, wherein said important data generating means comprises:

decoding means for decoding a predetermined coded video signal containing intra-picture coded data in the input coded video signal to obtain a decoded video signal; and data compression means for high efficiency coding said decoded video signal at a compression rate greater than a compression rate of the input coded video signal to obtain said important data.

20. The video signal recording apparatus as claimed in claim 19, wherein said predetermined coded video signal is a predetermined picture containing intra-picture coded data.

21. The video signal recording apparatus as claimed in claim 19, wherein said predetermined coded video signal is a predetermined intra-picture coded pixel.

22. A video signal recording and reproducing apparatus for recording on a recording medium an input coded video signal containing intra-picture coded data and inter-picture coded data, comprising:

important data generating means for generating important data from a part of the input coded video signal that contains intra-picture coded data, said important data generating means outputting the input coded video signal as is as normal data;

data arranging means for arranging said important data and said normal data in such an order that said important data is recorded in a specific area of the recording medium and said normal data is recorded in the remaining area of the recording medium;

data recording means for recording said important data and said normal data into said specific area and the remaining area, respectively, of the recording medium;

data reproducing means for reproducing the data recorded in said recording medium; and reproduction control means operable in a high speed reproduction mode for controlling said data reproducing means to reproduce said important data recorded in said recording medium.

23. The video signal recording and reproducing apparatus as claimed in claim 22, wherein said recording medium is a recording tape on which continuous tracks are formed, and wherein said data arranging means arranges said important data and said normal data in such a manner that continuous k1 tracks (k1 is a positive integer) in which said important data is allocated and continuous k2 tracks (k2 is a positive integer) in which only said normal data is allocated are alternately repeatedly recorded.

24. The video signal recording and reproducing apparatus as claimed in claim 23, wherein said data reproducing means performs reproduction in said high speed reproduction mode at a speed of $\pm m$ multiple of a normal speed where m is a positive integer, and wherein said continuous k1 tracks and continuous k2 tracks satisfy a condition expressed as k1+k2=m.

25. The video signal recording and reproducing apparatus as claimed in claim 23, satisfying a condition of k1 =1.

26. The video signal recording and reproducing apparatus as claimed in claim 23, satisfying a condition of k1 =2.

27. The video signal recording and reproducing apparatus as claimed in claim 23, wherein said data reproducing means performs reproduction in said high speed reproduction mode at a speed of $\pm m$ multiple of a normal speed, where m is a positive integer, wherein said data arranging means arranges said important data and said normal data such that said normal data is recorded at a period of n tracks, where n is an integer multiple of m, and wherein said continuous k1 tracks and continuous k2 tracks satisfy a condition expressed as k1+k2=n.

28. The video signal recording and reproducing apparatus as claimed in claim 22, wherein said recording medium is a recording tape on which continuous tracks are formed and said data reproducing means includes a reproducing head scanning the continuous tracks, and wherein said reproduction control means controls said recording tape so as to run at a normal speed when any tracks where said important data is recorded is scanned by said reproducing head and at a higher speed than the normal speed when the remaining track is scanned by said reproducing head.

* * * * *